United States Patent
Sen et al.

(10) Patent No.: US 11,107,375 B2
(45) Date of Patent: Aug. 31, 2021

(54) BACK MIRRORING SYSTEM AND BACK MIRRORING METHOD

(71) Applicant: PANASONIC INTELLECTUAL PROPERTY MANAGEMENT CO., LTD., Osaka (JP)

(72) Inventors: Yukiko Sen, Fukuoka (JP); Yoko Oie, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/795,239

(22) Filed: Feb. 19, 2020

(65) Prior Publication Data

US 2020/0273382 A1    Aug. 27, 2020

(30) Foreign Application Priority Data

Feb. 21, 2019    (JP) .............................. JP2019-029910

(51) Int. Cl.
*G09F 9/302*   (2006.01)
*H04N 5/225*   (2006.01)
*A47G 1/02*    (2006.01)

(52) U.S. Cl.
CPC ............... *G09F 9/302* (2013.01); *A47G 1/02* (2013.01); *H04N 5/225* (2013.01); *A47G 2200/08* (2013.01)

(58) Field of Classification Search
None
See application file for complete search history.

(56) References Cited

U.S. PATENT DOCUMENTS

2003/0065578 A1    4/2003  Peyrelevade et al.
2008/0097814 A1*   4/2008  Koustoumbardis ..........
                                         G06Q 10/06311
                                                705/7.13
(Continued)

FOREIGN PATENT DOCUMENTS

JP    200-138926 A      5/2000
JP    2016-189503 A    11/2016
(Continued)

OTHER PUBLICATIONS

Extended European Search Report dated Jul. 13, 2020 for the corresponding European Patent Application No. 20158200.4, 7 pages.
(Continued)

*Primary Examiner* — Edemio Navas, Jr.
(74) *Attorney, Agent, or Firm* — Seed IP Law Group LLP

(57) ABSTRACT

Provided is a back mirroring system including a camera that images a back view of a user, a mirror monitor that reflects a mirror image of a front side of the user and displays a capture video image, a user terminal communicable with the mirror monitor and a server, that sets information about a hair salon that is a transmission destination of the captured video image sent from the mirror monitor, and transmits the information to the server, and a hair salon terminal that is connected and communicable to the user terminal via the server, and that displays the captured video image sent from the user terminal via the server. The user terminal receives details pointed out regarding hair arrangement from a hair stylist who has viewed the captured video image via the hair salon terminal and the server, and displays the details pointed out.

8 Claims, 16 Drawing Sheets

(56) References Cited

U.S. PATENT DOCUMENTS

| | | | | |
|---|---|---|---|---|
| 2009/0116766 A1* | 5/2009 | Matsumoto | ............. | G06T 7/194 |
| | | | | 382/311 |
| 2013/0016078 A1* | 1/2013 | Kodali | .................... | G09F 19/16 |
| | | | | 345/204 |
| 2014/0313302 A1* | 10/2014 | Franke | ................. | A45D 44/005 |
| | | | | 348/77 |
| 2015/0371422 A1* | 12/2015 | Kokemohr | ................ | G06T 5/00 |
| | | | | 382/311 |
| 2017/0024885 A1* | 1/2017 | Miyazaki | ............... | A45D 44/00 |

FOREIGN PATENT DOCUMENTS

| | | |
|---|---|---|
| KR | 10-2015-0083609 A | 7/2015 |
| WO | 2014/176215 A2 | 10/2014 |

OTHER PUBLICATIONS

Franke et al., Drawings from EP Application No. 2988624A2 filed Mar. 2, 2016, 4 pages. (With English Abstract).

* cited by examiner

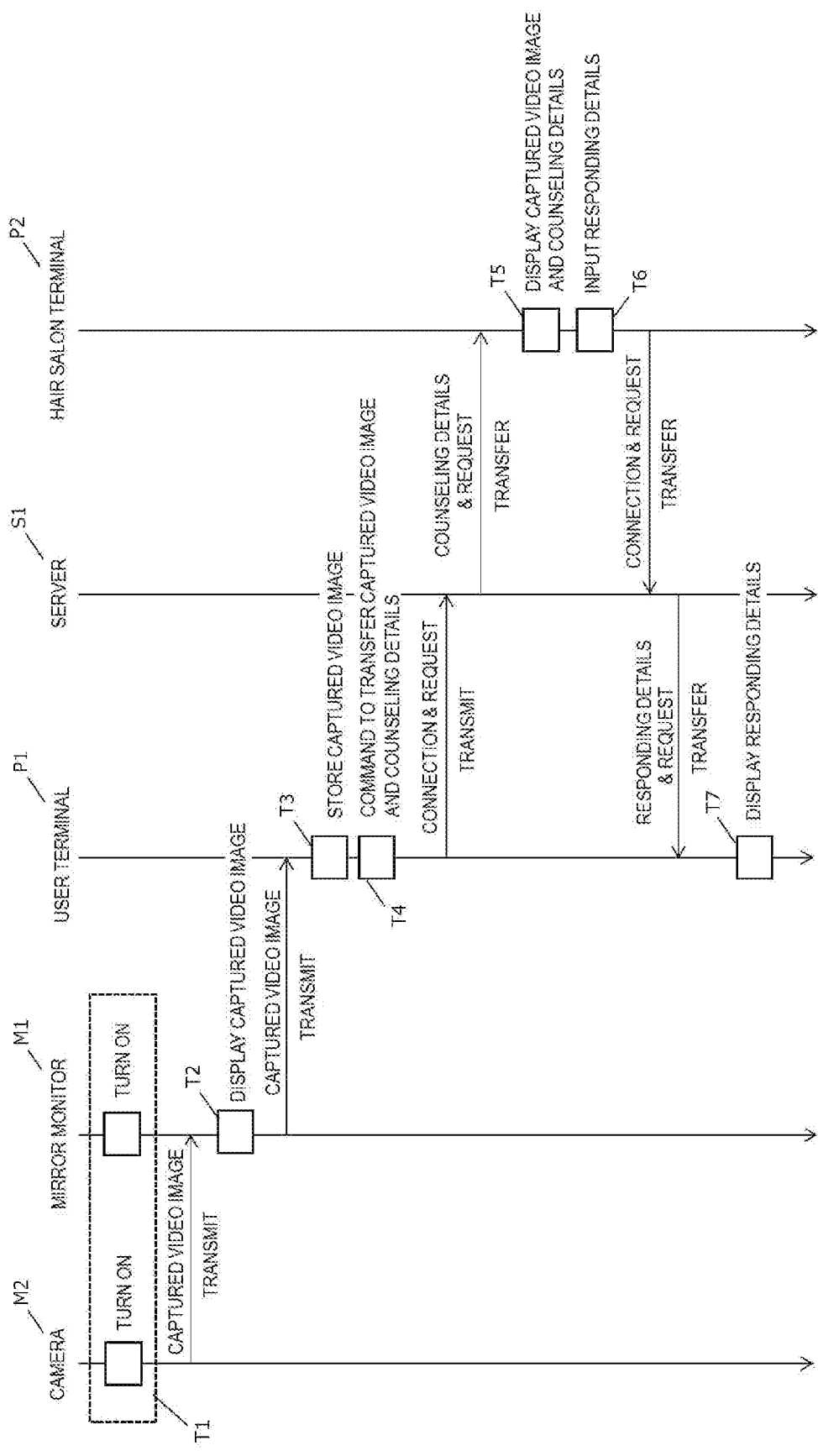

BACK MIRRORING SYSTEM AND BACK MIRRORING METHOD

CROSS REFERENCE TO RELATED APPLICATIONS

This application is based upon and claims the benefit of priority of Japanese Patent Application No. 2019-29910 filed on Feb. 21, 2019, the contents of which are incorporated herein by reference in its entirety.

BACKGROUND OF THE INVENTION

1. Field of the Invention

The present disclosure relates to a back mirroring system and a back mirroring method.

2. Description of the Related Art

In the related art, a composite display system that allows a user to view a head top, a back of head, and a back side of the user without changing a posture at which the user is viewing a mirror on the front side of the user and allows the user to freely use both hands is known. For example, Patent Literature 1, JP-A-2016-189503 discloses a configuration including a magic mirror that is mounted so as to face an object to be imaged, a display section that displays, on a rear surface of the magic mirror, an image that can be viewed from the object to be imaged, at least one imaging section that images the surroundings of the object to be imaged, a holding section that holds the imaging section at a desired position, and a control section that causes a video image output from the imaging section to be displayed. According to the composite display system, the user can view a head top, a back of head, and a back side of the user without changing a posture at which the user is viewing the magic mirror on the front side of the user, can use both hands, and can thus arrange hair, dye gray hair, make an arrangement for thin hair, or decorate hair.

As disclosed in Patent Literature 2, JP-A-2000-138926, a back mirroring apparatus that includes an image display device that is disposed on the front side of an object, a video camera that images the object, a disposition section that disposes the video camera behind the object, and a transmission section that transmits an image signal captured by the video camera to the image display device is known. According to the back mirroring apparatus, it is possible to display an image captured by the video camera on the image display device disposed on the front side of the user and to thereby adjust a sense of relative distance and a sense of direction of the back view displayed in a normal feeling to the user.

Patent Literature 1: JP-A-2016-189503
Patent Literature 2: JP-A-2000-138926

SUMMARY OF THE INVENTION

However, an improvement in techniques for user's hair arrangement is limited with these technical configurations in the related art. Even in a case in which each of a plurality of users tries to have the same hair style, for example, processes required to realize the same hairstyle may differ for each of the plurality of users since the users have different head shapes, hair textures, face outlines, and the like. Meanwhile, the users need to go to hair arrangement classes that teach hair arrangement methods suitable for the users or need to go to hair salons to ask advices based on the user's head shapes, hair textures, face outlines, and the like from hair stylists or the like in the related art in a case in which the users attempt to improve techniques for hair arrangement. However, since such hair arrangement classes are held mainly in cities, and users who live in countryside, for example, cannot join the classes often and cannot easily learn how to arrange hair. Since the number of times the users go to hair salons is several times a year according to an average statistic value, the users cannot get appropriate advice from hair stylists who know well about hair arrangement suitable for trends or seasons. Therefore, the users cannot acquire techniques for favorite hair arrangement.

The present disclosure was made in view of the aforementioned circumstances in the related art, and a non-limited object thereof is to provide a back mirroring system and a back mirroring method that facilitate acquisition of appropriate advice regarding hair arrangement from a hair stylist and that can support a user to improve techniques for hair arrangement.

According to the present disclosure, there is provided a back mirroring system including: a camera to be disposed behind a user, the camera being configured to capture a back view of the user; a mirror monitor that is configured to reflect a mirror image of a front side of the user and displays a video image captured by the camera; a user terminal that is configured to communicate with each of the mirror monitor and a server, that sets information about a hair salon that is a transmission destination of the captured video image sent from the mirror monitor, and transmits the information to the server; and a hair salon terminal to be disposed in the hair salon, the hair salon terminal being connected and communicable to the user terminal via the server, and configured to display the captured video image sent from the user terminal via the server, in which the user terminal receives details point out regarding hair arrangement from a hair stylist who has viewed the captured video image via the hair salon terminal and the server and displays the details pointed out.

Also, according to the present disclosure, there is provided a back mirroring method including: imaging a back view of a user using a camera; reflecting a mirror image of a front side of the user and displays a video image captured by the camera disposed behind the user using a mirror monitor; communicating by using user terminal with each of the mirror monitor and a server, and setting information about a hair salon that is a transmission destination of the captured video image sent from the mirror monitor and transmitting the information to the server using the user terminal; communicating with the user terminal and displaying the captured video image sent from the user terminal via the server using a hair salon terminal that is disposed in the hair salon and that is connected to the user terminal via the server; and receiving details pointed out regarding hair arrangement from a hair stylist who has viewed the captured video image via the hair salon terminal and the server and displays the details pointed out using the user terminal.

According to the present disclosure, it is possible to easily acquire appropriate advice in regard to hair arrangement from a hair stylist and to support a user to improve techniques for hair arrangement.

BRIEF DESCRIPTION OF THE DRAWINGS

In the accompanying drawings.

FIG. 8 is a sequence diagram illustrating an operation procedure example of the back mirroring system according to the first embodiment;

DETAILED DESCRIPTION OF THE EXEMPLARY EMBODIMENTS

Process to Achieve the Details in First Embodiment

Recently, a back mirroring system that allows a user to view a back side and a back of head of the user without changing a posture at which the user is viewing a mirror on the front side of the user is present. According to the back mirroring system in the related art, it is possible to easily arrange hair in a state in which the user can freely use both hands while viewing the back side and the back of head. However, there is a limit of an improvement in user's techniques for hair arrangement using this back mirroring system. Even in a case in which each of a plurality of users tries to have the same hair style, for example, processes or techniques required to realize the same hairstyle may differ for each of the plurality of users since the users have different head shapes, hair textures, face outlines, and the like. Meanwhile, the users need to go to hair arrangement classes that teach hair arrangement methods suitable for the users or need to go to hair salons to ask advices based on the user's head shapes, hair textures, face outlines, and the like from hair stylists or the like in the related art in a case in which the users attempt to improve techniques for hair arrangement. However, since such hair arrangement classes are held mainly in cities, and users who live in countryside, for example, cannot join the classes often and cannot easily learn how to arrange hair. Since the number of times the users go to hair salons is several times a year according to an average statistic value, the users cannot get appropriate advice from hair stylists who know well about hair arrangement suitable for trends or seasons. Therefore, the users cannot acquire techniques for favorite hair arrangement. However, JP-A-2016-189503 and JP-A-2000-138926 described above do not assume an improvement of user's techniques for hair arrangement beyond individual efforts.

Hereinafter, embodiments that specifically discloses configurations and effects of the back mirroring system and the back mirroring method according to the present disclosure will be described detail with appropriate reference to the drawings. However, unnecessarily detailed description may be omitted in some cases. For example, detailed description of matters that have already been known well and repeated description for substantially the same configurations may be omitted in some cases. This is for avoiding the following description from being unnecessarily redundant and for facilitating understanding of those skilled in the art. The accompanying drawings and the following description are provided for those skilled in the art to sufficiently understand the present disclosure and are not intended to limit the subject matter described in the claims.

First Embodiment

Figure 1:
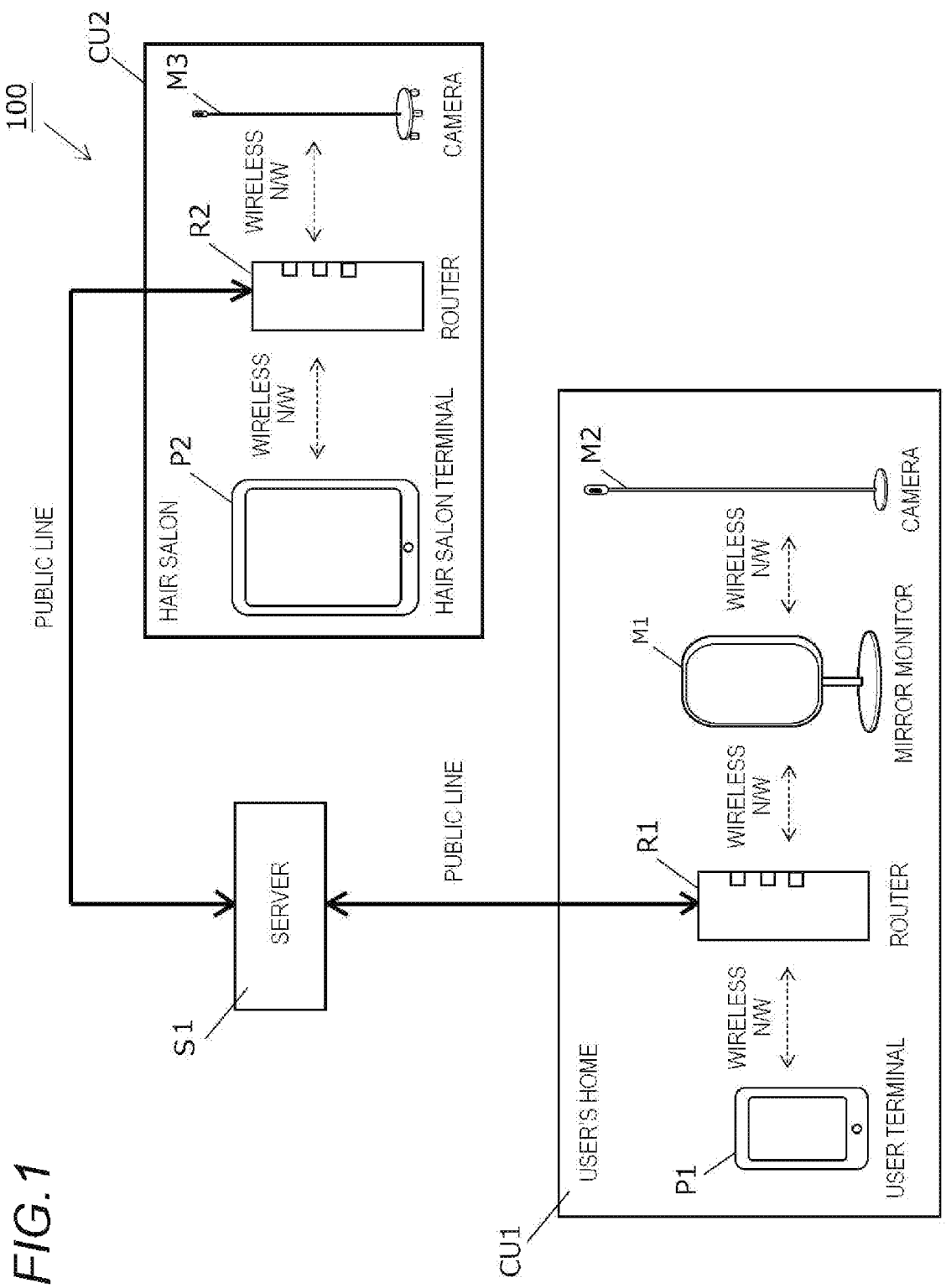
FIG. 1 is a diagram illustrating an outline example of a back mirroring system according to a first embodiment.

FIG. 1 is a diagram illustrating an outline example of a back mirroring system 100 according to a first embodiment. The back mirroring system 100 according to the first embodiment has a configuration including a user terminal P1 in a user's home CU1, a mirror monitor M1 and a camera M2, a server S1, and a hair salon terminal P2 and a hair salon camera M3 in a hair salon CU2. FIG. 1 illustrates a wireless network (N/W) for communication between the respective configurations in the user's home CU1 and the hair salon CU2 for easiness of description, the communication between the respective configurations in the user's home CU1 and the hair salon CU2 is performed via routers R1 and R2 mounted in the user's home CU1 and the hair salon CU2, respectively.

In the user's home CU1, the user terminal P1, the mirror monitor M1, and the camera M2 are disposed. Each of the user terminal P1, the mirror monitor M1, and the camera M2 performs communication using the wireless N/W via the router R1 mounted in the user's home CU1.

The camera M2 is a pan-tilt-zoom camera (PTZ camera) that can change a posture (in other words, an optical axis direction of a built-in lens) through at least one of pan turning and tilt turning and that can change a zooming magnification through zooming processing. The camera M2 is disposed behind a user H1 (see FIGS. 5A and 5B) and images a back view of the user H1. The camera M2 transmits the captured video image to the mirror monitor M1 via the router R1. The configuration related to the camera M2 may be provide with a caster similarly to a hair salon camera M3, which will be describe later.

The mirror monitor M1 includes a half mirror with predetermined beam transmittance on the entire surface thereof. The mirror monitor M1 adjusts luminance of a backlight (not illustrated) provided on the rear surface of the half mirror and displays the captured video image received from the camera M2 in a see-through manner. In this manner, the mirror monitor M1 serves as a mirror and reflects a mirror image of the user H1 located on the front side of the mirror when the backlight is turned off since the surroundings thereof are brighter (hereinafter, referred to as a mirror mode). Also, the mirror monitor M1 functions as a monitor when the backlight (not illustrated) is turned on since the luminance of the backlight is brighter than that of the surroundings (hereinafter, referred to as a monitor mode). The mirror monitor M1 further transmits the captured video image received from the camera M2 to the user terminal P1 via the router R1.

The user terminal P1 stores the captured video image received from the mirror monitor M1. The user terminal P1 sets information about the hair salon CU2 that is a transmission destination of the captured video image. Also, the user terminal P1 may create and set a text of counseling details regarding the captured video image or hair arrangement for a hair stylist who belongs to the hair salon CU2 to which the captured image is transmitted. The user terminal P1 transmits the information about the hair salon CU2 that is the transmission destination, the counseling details regarding the captured video image or hair arrangement, and the captured video image to the hair salon terminal P2 via the server S1.

The server S1 has user information (not illustrated) regarding the user H1 who uses the back mirroring system and hair salon data (not illustrated) regarding information about each hair salon and each hair stylist who belongs to each hair salon. The server S1 transfers the counseling details regarding the captured video image or hair arrangement and the captured video image to the hair salon terminal P2 in the hair salon CU2 that is the transmission destination via the wireless N/W based on the information about the hair salon set in the captured video image received from the user terminal P1. Similarly, the server S1 transfers responding details to the counseling details or the captured video image received from the hair salon terminal P2 to the user terminal P1 that has created the counseling details or has captured the captured video image.

In the hair salon CU2, the hair salon terminal P2 and the hair salon camera M3 are disposed. The hair salon terminal P2 and the hair salon camera M3 perform communication using a wireless N/W via the router R2 that is mounted in the hair salon CU2. The hair salon CU2 may be provided with a mirror monitor similarly to the user's home CU1.

The hair salon terminal P2 displays the counseling details regarding the captured video image or hair arrangement received from the user terminal P1 via the server S1 and the captured video image. The hair salon terminal P2 sets responding details to the counseling details or the captured video image. The hair salon terminal P2 transmits the responding details to the counseling details or the captured video image to the user terminal P1 that is a reception destination via the server S1.

The hair salon camera M3 captures the back view of the user H1 in a case in which the user H1 visited the hair salon CU2. The hair salon camera M3 is a pan-tilt-zoom (PTZ) camera that can change the posture (in other words, an optical axis direction of a built-in lens) through at least one of pan turning and tilt turning and can change a zooming magnification through zooming processing. The hair salon camera M3 is disposed behind the user H1 (see FIGS. 5A and 5B) and images the back view of the user H1. The hair salon camera M3 transmits the captured video image to the user terminal P1, the hair salon terminal P2, and the mirror monitor (not illustrated) mounted in the hair salon CU via the router R2. The hair salon camera M3 may be provided with a caster for facilitating moving. In this manner, even in a case in which only a small number of hair salon cameras M3 are present relative to a plurality of sheets for treating guests, for example, in the hair salon CU2, it is possible to easily move the hair salon camera M3 and to adjust the position thereof.

Figure 2:
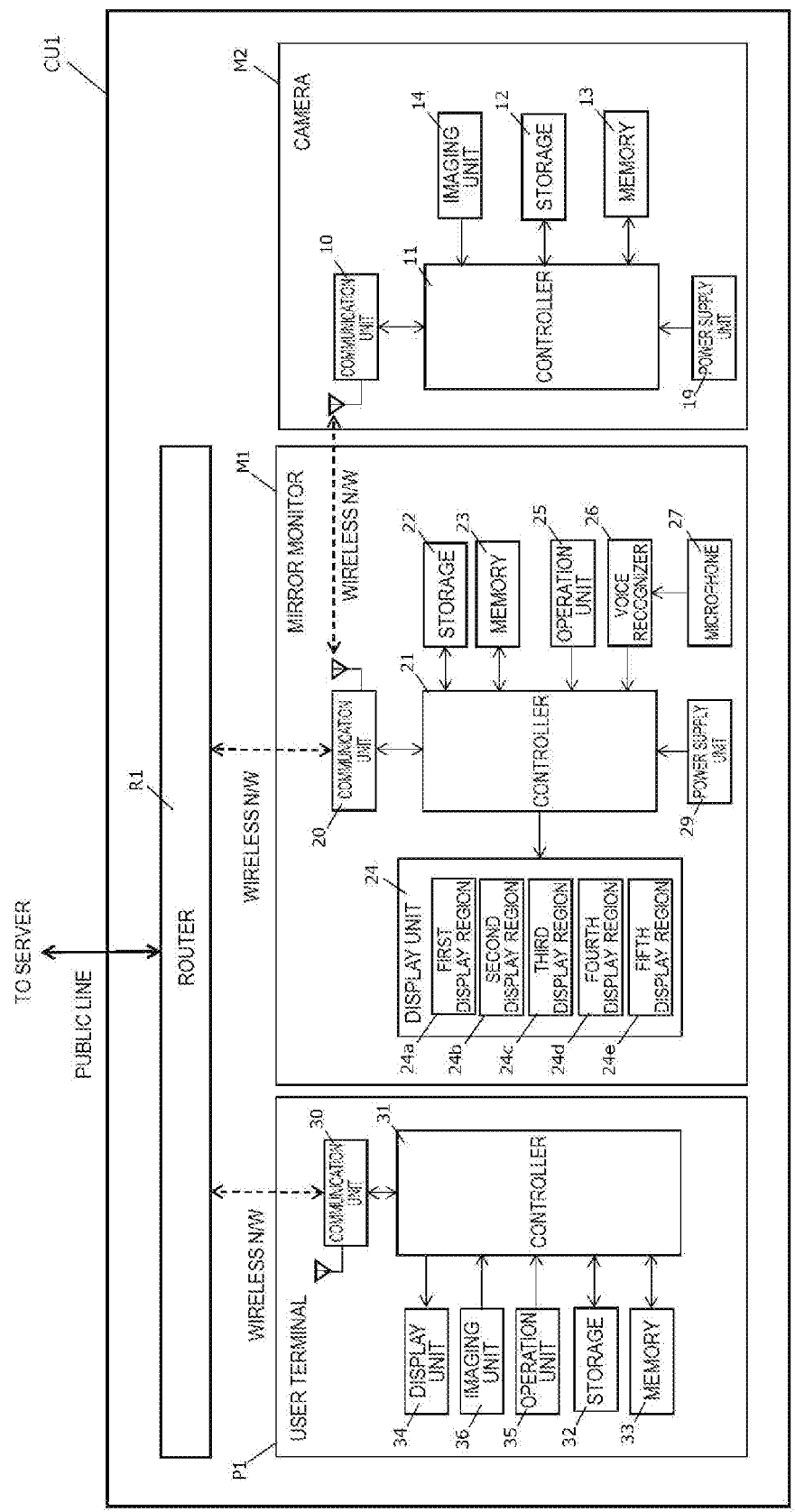
FIG. 2 is a block diagram illustrating a system configuration example of a user's home according to the first embodiment.

FIG. 2 is a block diagram illustrating a system configuration example of the user's home CU1 according to the first embodiment. The system configuration in the user's home CU1 according to the first embodiment includes the user terminal P1, the mirror monitor M1, and the camera M2. In FIG. 2, the user terminal P1, the mirror monitor M1, and the camera M2 perform communication therebetween via the router R1 mounted in the user's home CU1 for easiness of description.

First, a configuration example of the camera M2 will be described. The camera M2 includes a communication unit 10, a controller 11, a storage 12, a memory 13, an imaging unit 14, and a power supply unit 19.

The communication unit 10 is connected to the mirror monitor M1 using a wireless network (N/W) via the router R1 such that the communication unit 10 can communicate with the mirror monitor M1. The communication unit 10 may be connected to the mirror monitor M1 through Bluetooth (registered trademark) such that the communication unit 10 can communicate with the mirror monitor M1. When the imaging unit 14 starts to capture an image, then the communication unit 10 transmits a captured video image, which is input from the imaging unit 14 to the controller 11, to the mirror monitor M1.

The controller 11 is configured using a central processing unit (CPU) or a field programmable gate array (FPGA), for example, works in conjunction with the memory 13, and performs various kinds of processing and control. Specifically, the controller 11 refers to a program and data stored in the memory 13 and executes the program, thereby realizing functions of the respective components. The functions of the respective components include a pan-tilt-zoom function, a function of executing a predetermined command recognized by a voice recognizer 26 in the mirror monitor M1, which will be described later, and the like.

The storage 12 stores the captured video image of the back view of the user H1 captured by the imaging unit 14.

The memory 13 has, for example, a random access memory (RAM) that serves as a work memory used when the controller 11 executes various kinds of processing and a read only memory (ROM) that stores a program and data that define operations of the controller 11. The RAM temporarily saves data or information generated or acquired by the controller 11. A program that defines operations of the controller 11 is written in the ROM.

The imaging unit 14 has, as an imaging element, a charge coupled device (CCD) or a complementary metal oxide semiconductor (CMOS). The imaging unit 14 has a focus lens that can adjust a focal point distance, a zoom lens that can change a zooming magnification, and a gain adjustment unit that can adjust sensitivity of the imaging element. The imaging unit 14 outputs the captured video image to the controller 11.

The power supply unit 19 supplies a power supply to the camera M2 and enables the respective components included in the camera M2 to operate. The power supply unit 19 may include a capacitor capable of accumulating electric charge.

Next, a configuration example of the mirror monitor M1 will be described. The mirror monitor M1 includes a communication unit 20, a controller 21, a storage 22, a memory 23, a display unit 24, an operation unit 25, a voice recognizer 26, a microphone 27, and a power supply unit 29.

The communication unit 20 is connected to the camera M2 and the user terminal P1 using a wireless network (N/W) via the router R1 such that the communication unit 20 can communicate with the camera M2 and the user terminal P1. The communication unit 20 may be connected to the camera M2 and the user terminal P1 through Bluetooth (registered trademark) such that the communication unit 20 can communicate with the camera M2 and the user terminal P1. The communication unit 20 receives the captured video image from the camera M2 and further transmits the received captured video image to the user terminal P1. The communication unit 20 may be able to communicate directly with a communication unit 60 of the hair salon terminal P2 without the user terminal P1.

The controller 21 is configured using a central processing unit (CPU) or a field programmable gate array (FPGA), for example, works in conjunction with the memory 23, and performs various kinds of processing and control. Specifically, the controller 21 refers to a program and data stored in the memory 23 and executes the program, thereby realizing functions of the respective components. The functions of the respective components include a function of controlling display for executing the mirror mode (for example, a function of adjusting luminance of each of a plurality of display regions 24a, 24b, 24c, 24d, and 24e of the display unit 24 in the mirror mode), a function of executing control based on a predetermined command recognized by the voice recognizer 26, and the like. In a case in which the predetermined command recognized by the voice recognizer 26 is a command given to the camera M2, the controller 21 transmits the predetermined command to the camera M2 via the communication unit 20.

The storage 22 stores the captured video image received from the camera M2. The storage 22 stores a favorite video image received from the user terminal P1, which will be described later, an operation history regarding hair arrangement of the user H1 based on an external operation performed by the user H1, or the like.

The memory 23 has, for example, a random access memory (RAM) that serves as a work memory used when the controller 21 executes various kinds of processing and a read only memory (ROM) that stores a program and data that define operations of the controller 21. The RAM temporarily saves data or information generated or acquire by the controller 21. A program that defines operations of the controller 11 is written in the ROM.

The display unit 24 includes a half mirror with predetermined beam transmittance on the entire surface, for example, and a display with a backlight provided on the entire rear surface of the half mirror. The display unit has a mirror mode that serves as a mirror and reflects a mirror image of the user H1 located on the front side of the display unit 24 when the backlight is turned off since the surroundings are brighter, and a monitor mode that functions as a monitor when the backlight (not illustrated) is turned on since the luminance of the backlight is brighter than that of the surroundings. Hereinafter, the monitor mode will be described.

The display unit 24 in the monitor mode has a plurality of display regions, namely display regions 24a, 24b, 24c, 24d, and 24e on the display. Each of the plurality of display regions 24a to 24e can adjust luminance based on control performed by the controller 21. The display unit 24 turns on a backlight located in each of the plurality of display regions 24a to 24e based on the luminance adjusted by the controller 21. The display unit 24 displays light from the backlight on the half mirror in a see-through manner. At least one of the plurality of display regions 24a to 24e is constantly in the mirror mode, and for example, the first display region 24a among the plurality of display regions 24a to 24e is a display region that is constantly in the mirror mode and displays a mirror image of the user H1 located on the front side of the mirror monitor M1.

The operation unit 25 is a touch panel that receives operations performed by the user H1, for example. The operation unit 25 outputs information about specific operations such as touching performed by the user H1 to the controller 21.

The microphone 27 collects voice generated by the user H1. The microphone 27 outputs the collected voice to the voice recognizer 26.

When the voice of the user H1 collected by the microphone 27 is input, then the voice recognizer 26 recognizes a predetermined command related to control of the mirror monitor M1 and the camera M2 included in the user's voice and outputs the command to the controller 21. The predetermined word includes "larger", "smaller", "start", "stop", "quickly", "slowly", "one more time", "go back", and the like for a predetermined command related to control of the mirror monitor M1, for example, and "on", "off", "zoom", and the like for a predetermined command related to control of the camera M2. Such a predetermined command may be recognized with names of the mirror monitor M1 and the camera M2, and in a case in which a command that can be used for both the mirror monitor M1 and the camera M2, such as "larger" or "smaller" is made, for example, the voice recognizer 26 may recognize a combination of the name and the command, such as "mirror monitor, larger" or "camera, larger". The sound recognizer 26 may recognize similar words as the same word and may recognize "go back" and "please go back" as the same predetermined command, for example. These predetermined commands are stored in the memory 23. The aforementioned predetermined command examples are just a part of the commands, and the predetermined commands are not limited thereto. In this manner, it is not necessary for the user H1 to perform an operation or control with hands, and the user H1 can easily continue to arrange hair. The voice recognizer 26 outputs the recognized predetermined command to the controller 21.

The power supply unit 29 supplies a power supply to the mirror monitor M1 and enables the respective components included in the mirror monitor M1 to operate. Also, the power supply unit 29 may be configured to include a capacitor capable of accumulating electric charge.

Next, a configuration example of the user terminal P1 will be described. The user terminal P1 is a smartphone that the user H1 owns, for example. The user terminal P1 includes a communication unit 30, a controller 31, a storage 32, a memory 33, a display unit 34, an operation unit 35, and an imaging unit 36.

The communication unit 30 is connected to the camera M2 and the mirror monitor M2 using a wireless network (N/W) via the router R1 such that the communication unit 30 can communicate with the camera M2 and the mirror monitor M1. The communication unit 30 may be connected to the camera M2 and the mirror monitor M1 through Bluetooth (registered trademark) such that the communication unit 30 can communicate with the camera M2 and the mirror monitor M1. The communication unit 30 receives the captured video image form the mirror monitor M1 and further transmits the received captured video image to the hair salon terminal P2 via the server S1 and the server S2. The communication unit 30 may receive the captured video image directly from the camera M2.

The controller 31 is configured using a central processing unit (CPU) or a field programmable gate array (FPGA), for example, works in conjunction with the memory 33, and performs various kinds of processing and control. Specifically, the controller 31 refers to a program and data stored in the memory 33 and executes the program, thereby realizing functions of the respective components. The functions of the respective components include, for example, a function of setting information about the hair salon CU2 that is a transmission destination of the captured video image, a function of creating counseling details regarding the captured video image or hair arrangement as a text for a hair stylist who belongs to the hair salon CU2 to which the captured video image is transmitted, and the like.

The controller 31 sets counseling details regarding the captured video image or hair arrangement as a text for the hair salon CU2 that is the transmission destination of the captured video image or for the hair stylist who belongs to the hair salon CU2 to which the captured video image is transmitted based on the video image captured by the imaging unit 36.

The controller 31 can also cause the server S1 to store the video image or the image captured by the imaging unit 36. In a case in which the server S1 is caused to store the captured video image or the captured image, the controller 31 selects and sets any one of individual data 42a and a released data 42b, which are released to different targets, for the captured video image or the captured image. For example, the individual data is data from which the user H1 and the hair salon CU2 that the user H1 has set (in other words, the hair salon terminal P2 mounted in the set hair salon CU2 or a specific hair stylist who belongs to the hair salon CU2) can view the captured video image or the captured image and is stored in the server S1. Also, the released data 42b is data that other users or other hair salon CU2 can further view. The user H1 sets targets who can view the released data 42b, and the released data 42b is stored in the server S1 such that the released data 42b can be released to the target of releasing based on the setting.

The storage 32 stores the captured video image received from the camera M2, the image captured by the imaging unit 36, and data related to favorite video image that are other captured video images of other users stored in the server S1, which will be described later.

The memory 33 has, for example, a random access memory (RAM) that serves as a work memory used when the controller 31 executes various kinds of processing and a read only memory (ROM) that stores a program and data that defines operations of the controller 31. The RAM temporarily saves data or information generated or acquired by the controller 31. A program that defines operations of the controller 31 is written in the ROM.

The display unit 34 displays the captured video image received from the mirror monitor M1 and responding details that have been transmitted from the hair salon terminal P2, which will be described later, via the server S1. The display unit 34 may display the captured video image received directly from the camera M2.

The operation unit 35 is a touch panel that receives operations performed by the user H1, for example. The operation unit 35 outputs information about specific operations such as a touch operation performed by the user H1 to the controller 31.

The imaging unit 36 has, as an imaging element, a charge coupled device (CCD) or a complementary metal oxide semiconductor (CMOS). The imaging unit 36 has a focus lens that can adjust a focal point distance, a zoom lens that can change a zooming magnification, and a gain adjustment unit that can adjust sensitivity of the imaging element. The imaging unit 36 outputs the captured image to the controller 31.

Figure 3:
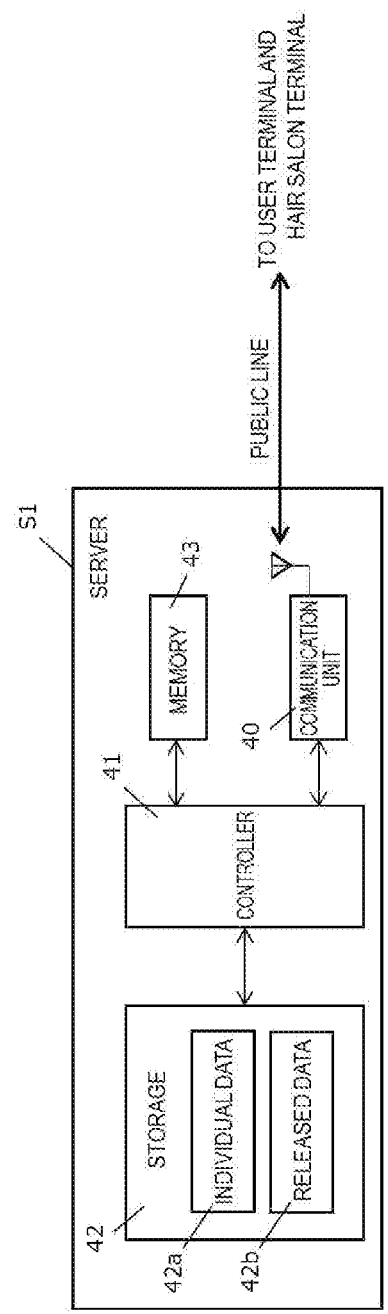
FIG. 3 is a block diagram illustrating a system configuration example of a server according to the first embodiment.

FIG. 3 is a block diagram illustrating a system configuration example of the server S1 according to the first embodiment. Referring to FIG. 3, a configuration example of the server S1 will be described. The server S1 includes a communication unit 40, a controller 41, a storage 42, and a memory 43.

The communication unit 40 is connected to the user terminal P1 and the hair salon terminal P2 using a wireless network (N/W) such that the communication unit 40 can communicate with the user terminal P1 and the hair salon terminal P2. The communication unit 40 may be connected not only to the user terminal P1 but also to the mirror monitor M1 and the hair salon terminal P2 such that the communication unit 40 can communicate with the mirror monitor M1 and the hair salon terminal P2. The communication unit 40 receives, from the user terminal P1, the captured video image, the information about the hair salon CU2 that is the transmission destination of the captured video image, and the counseling details regarding the captured video image or hair arrangement for the hair stylist who belongs to the hair salon CU2 to which the captured video image is transmitted. The communication unit 40 outputs the received information about the hair salon CU2 to the controller 41 and transmits the captured video image and the counseling details regarding the captured video image or hair arrangement to the hair salon terminal P2 that is the transmission destination based on a control signal from the controller 41.

The controller 41 is configured using a central processing unit (CPU) or a field programmable gate array (FPGA), for example, works in conjunction with the memory 43, and performs various kinds of processing and control. Specifically, the controller 41 refers to a program and data stored in the memory 43 and executes the program, thereby realizing functions of the respective components. The functions of the respective components include a function of deciding each hair salon that is a transmission destination based on information about each hair salon set in the captured video image received from the user terminal P1 and transmits the captured video image and counseling details regarding the captured video image or hair arrangement to the hair salon terminal mounted in each hair salon that is the transmission destination, a function of selecting and storing the individual data 42a and the released data 42b in the storage 42 based on the captured video image or targets of releasing set for the captured image.

The storage 42 selects and stores any one of the individual data 42a and the released data 42b based on the captured video image received from the user terminal P1 and the information about the set targets of releasing. The storage 22 stores each of the individual data 42a and the released data 42b for each user. Also, the storage 42 has user information (not illustrate) related to the user H1 who uses the back mirroring system and hair salon data (not illustrated) related to information about each hair salon and each hair stylist who belongs to each hair salon, and in a case in which the captured video image or the counseling details regarding the captured video image or hair arrangement is received from the user terminal P1, the storage 42 specifies the hair salon CU2 and the hair salon terminal P2 that are transmission destinations from the hair salon data based on the information about the set hair salon CU2 and transmits the captured video image or the counseling details to the hair salon terminal P2.

The storage 42 has advertisement data (not illustrated) created by a company, a hair salon, or the like. The advertisement data is data for advertising hair arrangement classes for teaching hair arrangement method, advertisement data for hair accessories used for hair arrangement, or the like. In this manner, the user H1 can receive advertisement suitable for the user H1, and the company, the hair salon, and the like can perform efficient advertisement.

The memory 43 has, for example, a random access memory (RAM) that serves as a work memory used when the controller 41 executes various kinds of processing and a read only memory (ROM) that stores a program and data that define operations of the controller 41. The RAM temporarily saves data or information generated or acquired by the controller 41. A program that defines operations of the controller 41 is written in the ROM.

Figure 4:
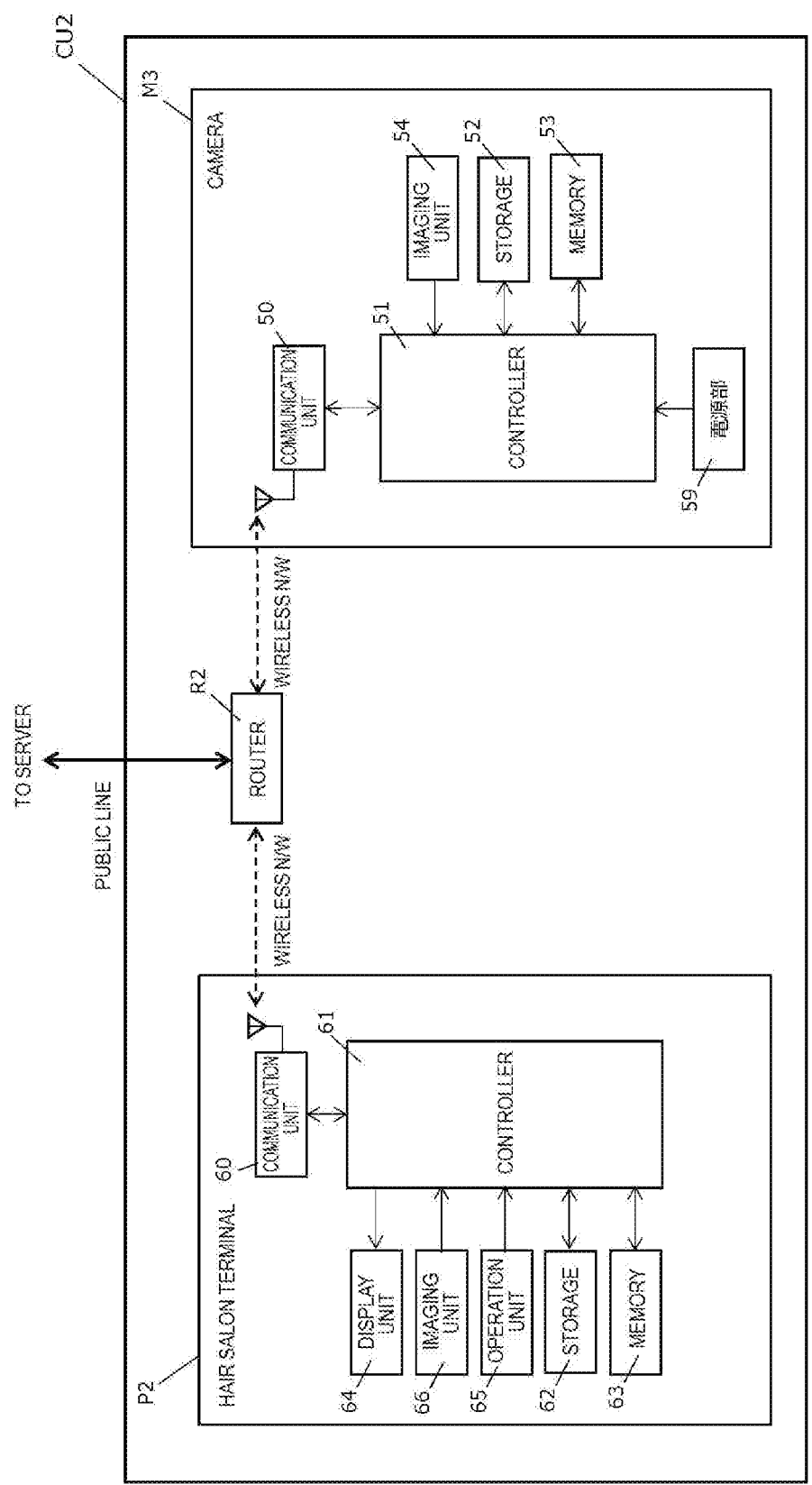
FIG. 4 is a block diagram illustrating a system configuration example of a hair salon according to the first embodiment.

FIG. 4 is a block diagram illustrating a system configuration example of the hair salon CU2 according to the first embodiment. The system configuration in the hair salon CU2 according to the first embodiment includes the hair salon terminal P2 and the hair salon camera M3. In FIG. 2, the hair salon terminal P2 and the hair salon camera M3 performs communication via the router R2 mounted in the hair salon CU2 for easiness of description.

First, a configuration example of the hair salon camera M3 will be described. The hair salon camera M3 includes a communication unit 50, a controller 51, a storage 52, a memory 53, an imaging unit 54, and a power supply unit 59.

The communication unit 50 is connected to the hair salon terminal P2 using a wireless network (N/W) via the router R2 such that the communication unit 50 can communicate with the hair salon terminal P2. The communication unit can be connected to the hair salon terminal P2 through Bluetooth (registered trademark) such that the communication unit 50 can communicate with the hair salon terminal P2. When the imaging unit 54 starts to capture an image, then the communication unit 50 transmits, to the hair salon terminal P2, the captured video image input from the imaging unit 54 to the controller 51.

The controller 51 is configured using a central processing unit (CPI) or a field programmable gate array (FPGA), for example, works in conjunction with the memory 53, and performs various kinds of processing and control. Specifically, the controller 51 refers to a program and data stored in the memory 53 and executes the program, thereby realizing functions of the respective components. The functions of the respective components include a pan-tilt-zoom function and the like.

The storage 52 stores a captured video image of the back view of the user H1, which has been captured by the imaging unit 54.

The memory 53 has, for example, a random access memory (RAM) that serves as a work memory used when the controller 51 performs various kinds of processing and a read only memory (ROM) that stores a program and data that define operations of the controller 51. The RAM temporarily saves data or information generated or acquired by the controller 51. A program that defines operations of the controller 51 is written in the ROM.

The imaging unit 54 has, as an imaging element, a charge coupled device (CCD) or a complementary metal oxide semiconductor (CMOS). The imaging unit 54 has a focus lens that can adjust a focal point distance, a zoom lens that can change a zooming magnification, and a gain adjustment unit that can adjust sensitivity of the imaging element. The imaging unit 54 outputs the captured video image to the controller 51.

The power supply unit 59 supplies a power supply to the hair salon camera M3 and enables the respective components included in the hair salon camera M3 to operate. The power supply unit 59 may be configured to include a capacitor capable of accumulating electric charge.

Next, a configuration example of the hair salon terminal P2 will be described. The hair salon terminal P2 is a smartphone or a tablet that the hair salon CU2 owns, for example. The hair salon terminal P2 includes a communication unit 60, a controller 61, a storage 62, a memory 63, a display unit 64, an operation unit 65, and an imaging unit 66.

The communication unit 60 is connected to the hair salon camera M3 using a wireless network (N/W) via the router R2 such that the communication unit 60 can communicate with the hair salon camera M3. The communication unit 60 may be connected to the hair salon camera M3 through Bluetooth (registered trademark) such that the communication unit 60 can communicate with the hair salon camera M3. The communication unit 60 receives, from the server S1, the captured video image or the captured image capturing the user H1 and the counseling details regarding the captured video image and hair arrangement. The communication unit 60 transmits responding details to the counseling details regarding the captured video image and hair arrangement, which has been created by a hair stylist, to the user terminal P1 via the server S1.

The controller 61 is configured using a central processing unit (CPU) or a field programmable gate array (FPGA), for example, works in conjunction with the memory 63, and performs various kinds of processing and control. Specifically, the controller 61 refers to a program and data stored in the memory 63 and executes the program, thereby realizing functions of the respective components. The functions of the respective components include a function of creating counseling details regarding the captured video image or hair arrangement, for example.

The controller 61 creates and transmits responding details using a video image or an image captured by the imaging unit 66 based on an external operation performed by the hair stylist or responding details created as a text in response to the captured video image and the counseling details regarding the captured video image or hair arrangement received from the user terminal P1.

The storage 62 stores the captured video image and the captured image and the counseling details regarding the captured video image or hair arrangement received from the user terminal P1. The storage 62 stores the video image and the image captured by the imaging unit 36 and the responding details to the counseling details received from the user terminal P1. The storage 62 may have user information (not illustrated) regarding the user H1 who uses the hair salon CU2 and store data for each user (for example, not only the captured video image, the captured image, the counseling details, and the responding details but also individual information and the like of the user H1).

The memory 63 has, for example, a random access memory (RAM) that serves as a work memory used when the controller 61 executes various kinds of processing and a read only memory (ROM) that stores a program and data that define operations of the controller 61. The RAM temporarily saves data or information generated or acquired by the controller 61. A program that defines operations of the controller 61 is written in the ROM.

The display unit 64 displays the captured video image and the captured image and the counseling details regarding the captured video image or hair arrangement received from the user terminal P1. In a case in which the user H1 visited the hair salon CU2 and is treated there, the display unit 64 displays the captured video image received directly from the hair salon camera M3.

The operation unit 65 is, for example, a touch panel that receives external operations performed by a hair stylist. The operation unit 65 outputs information about specific operations such as a touch operation performed by the hair stylist to the controller 61.

The imaging unit 66 has, as an imaging element, a charge coupled device (CCD) or a complementary metal oxide semiconductor (CMOS). The imaging unit 66 has a focus lens that can adjust a focal point distance, a zoom lens that can change a zooming magnification, and a gain adjustment unit that can adjust sensitivity of the imaging element. The imaging unit 66 causes the storage 62 to store the captured video image or the captured image and outputs the captured video image or the captured image to the controller 61.

Figure 5A:
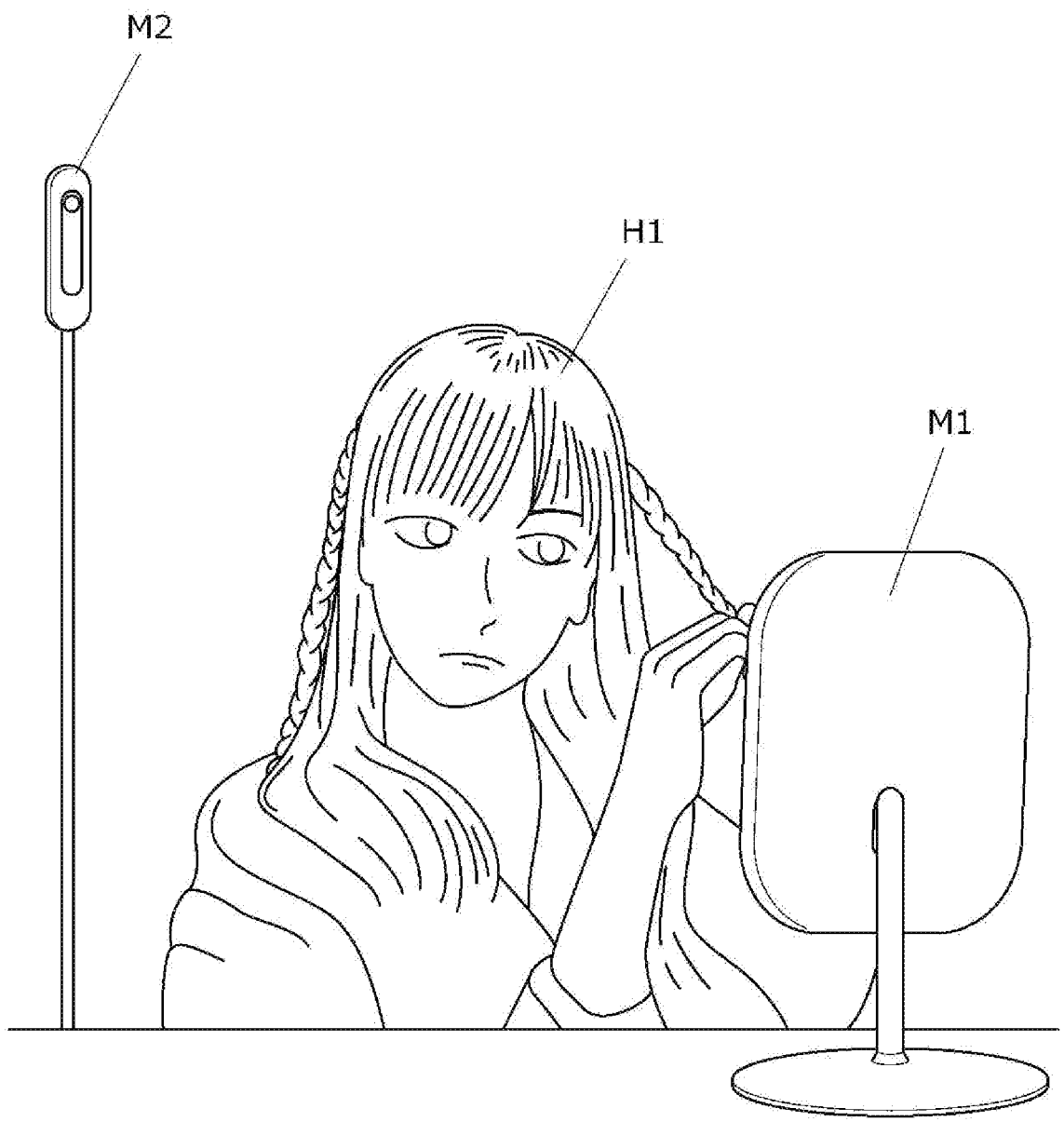
FIG. 5A is a diagram illustrating an example in which a camera and a mirror monitor are used in a user's home.
Figure 5B:
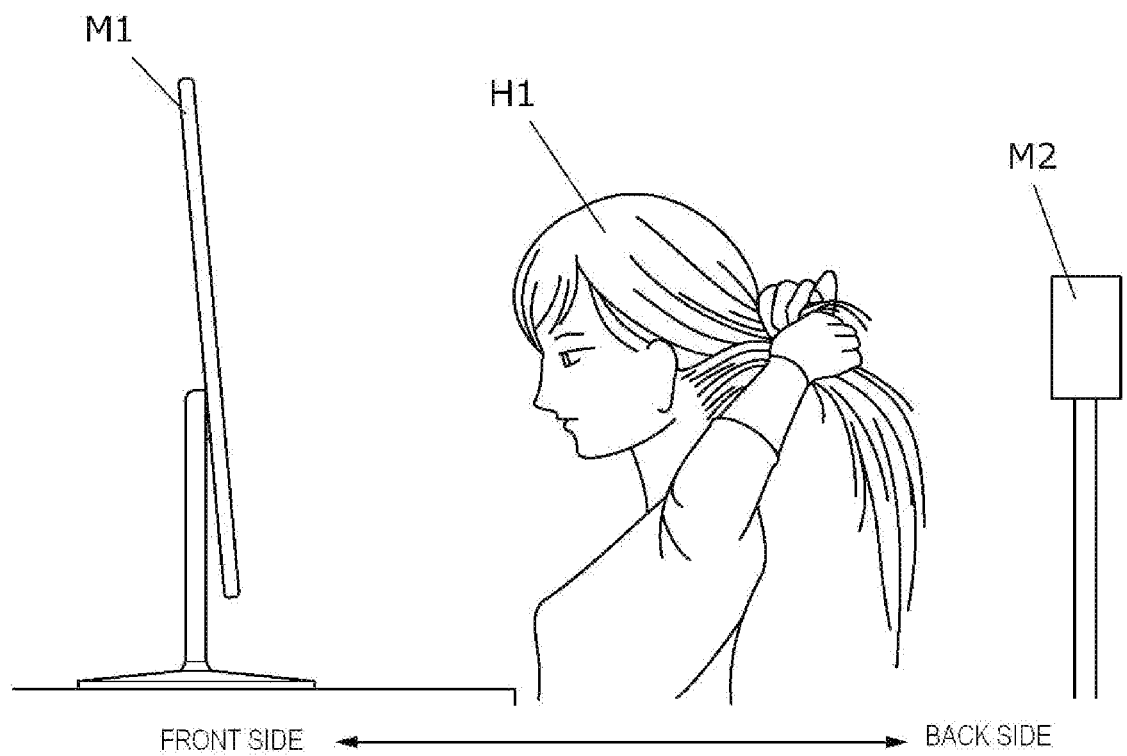
FIG. 5B is a diagram illustrating an example in which a camera and a mirror monitor are used in a user's home.

FIG. 5A is a diagram illustrating an example in which the camera M2 and the mirror monitor M1 are used in the user's home CU1. FIG. 5B is a diagram illustrating an example in which the camera M2 and the mirror monitor M1 are used in the user's home CU1. FIG. 5A illustrates an example of utilization when seen from the front side (from the closer side of the paper) of the user H1. FIG. 5B illustrates an example of utilization when seen from the side surface side of the user H1 and illustrates a disposition relationship between the user H1, the camera M2, and the mirror monitor M1.

The mirror monitor M1 is disposed on the front side of the user H1 and reflects a mirror image of the front side of the user H1 that faces the mirror monitor M1 in the mirror mode.

The camera M2 is disposed behind the user H1 (in other words, on the back side) and images the back view of the user H1. In this manner, the user H1 can check the back view, the back of head, and the top of head through the mirror monitor M1. Therefore, the user can easily perform not only hair arrangement but also checking of gray hair and dying gray hair at the top of head.

As described above, the back mirroring system 100 according to the first embodiment can reflect and display the front side and the back view of the user H1 on the mirror monitor M1 at the same time by disposing the mirror monitor M1 and the camera M2. Therefore, the user H1 can perform hair arrangement using both hands.

Figure 6A:
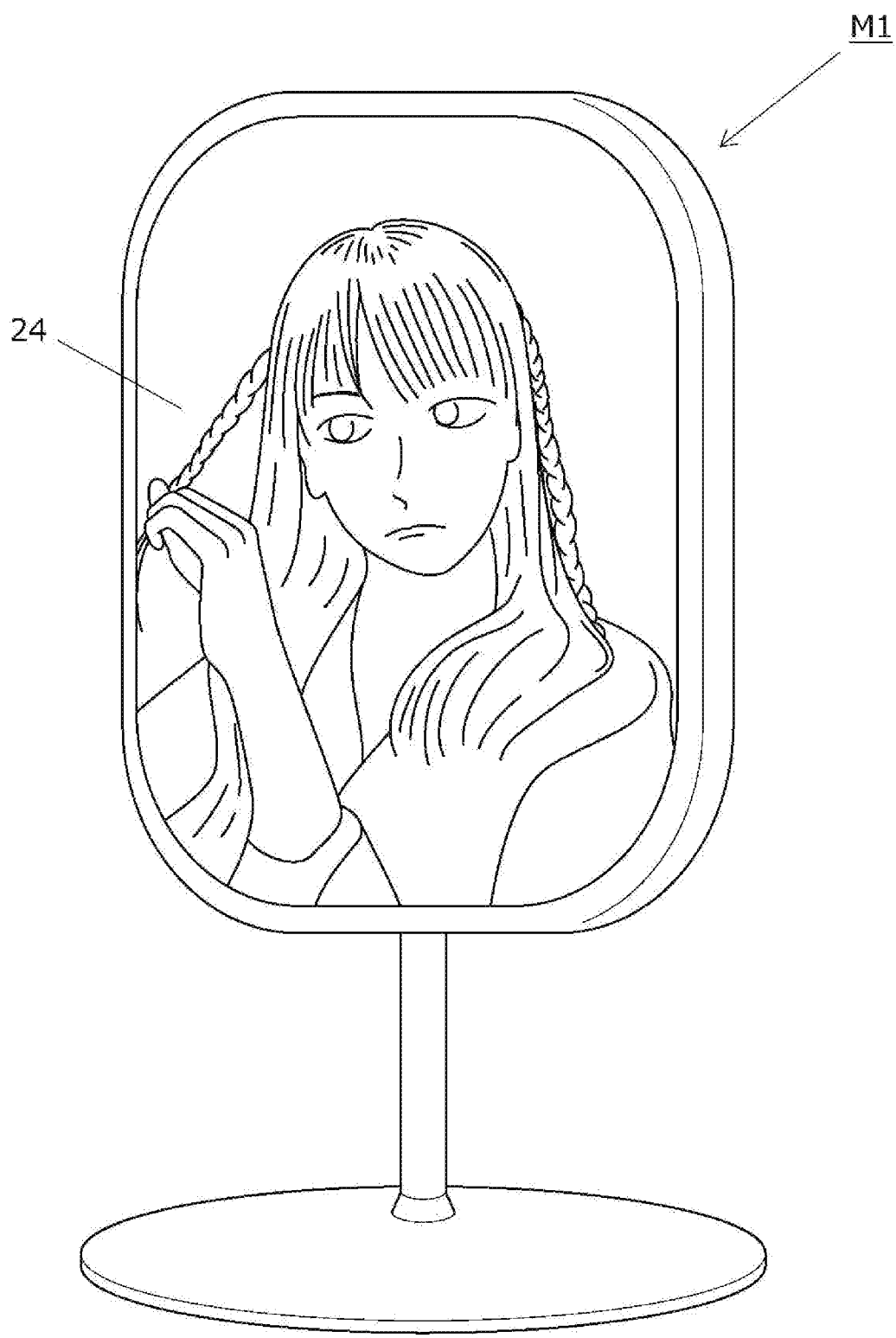
FIG. 6A is a diagram illustrating an example of a mirror mode of the mirror monitor.

FIG. 6A is a diagram illustrating an example of the mirror mode of the mirror monitor M1. The mirror monitor M1 is in the mirror mode in a case in which the power supply of the mirror monitor M1 is turned on and in a case in which the power supply thereof is turned on and the illumination of the backlight is zero. The mirror monitor M1 reflects the mirror image of the front side of the user H1 who faces the display unit 24 in the mirror mode.

Figure 6B:
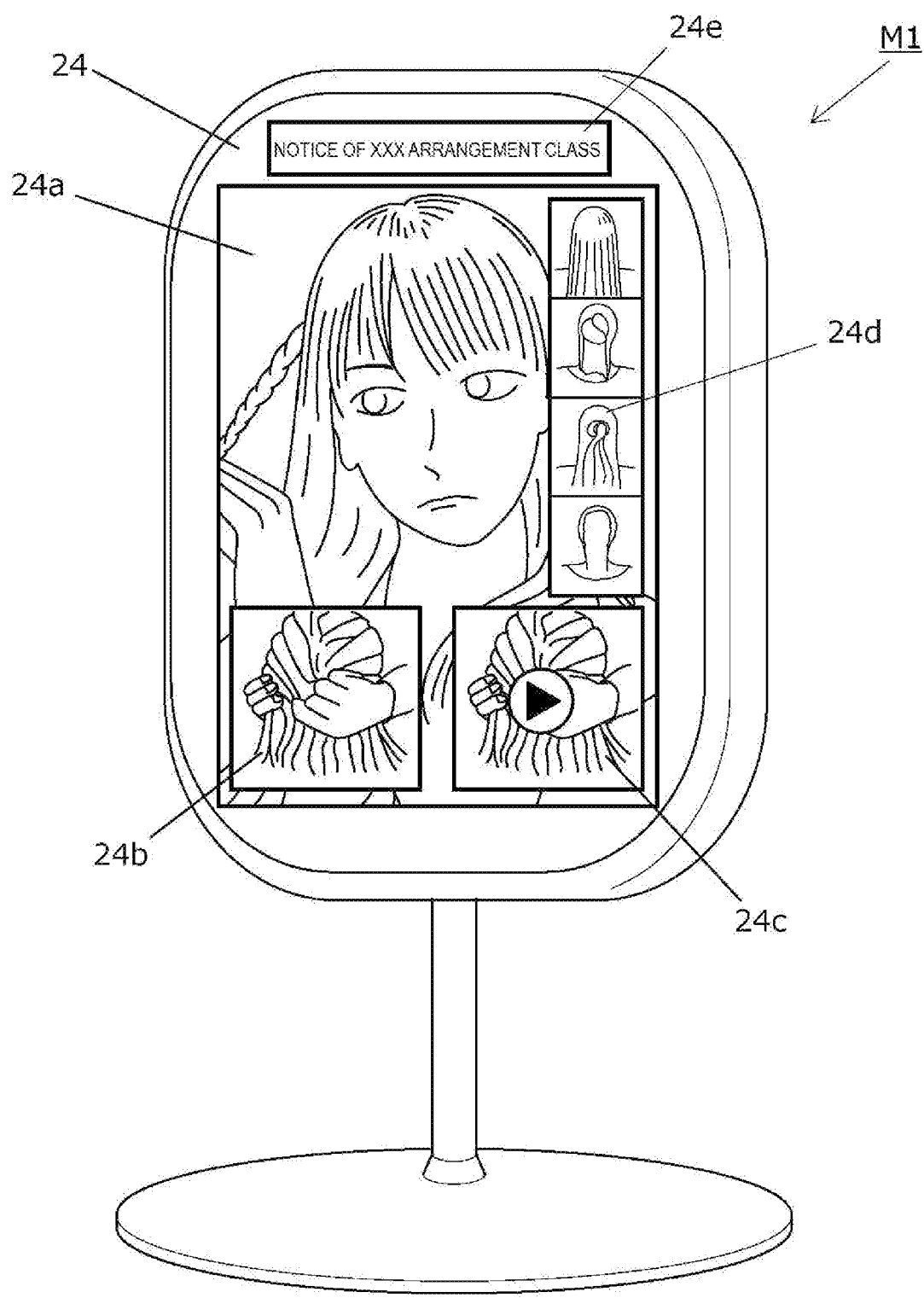
FIG. 6B is a diagram illustrating an example of a monitor mode of the mirror monitor.

FIG. 6B is a diagram illustrating an example of the monitor mode of the mirror monitor. The mirror monitor M1 is in the monitor mode in a case in which the power supply of the mirror monitor M1 is turned on and in a case in which the power supply is turned on and the mirror monitor M1 functions as a monitor since the illumination of the backlight is brighter than that in the surroundings.

The mirror monitor M1 in the monitor mode has a plurality of display regions, namely display regions 24a to 24e in the display unit 24. Each of the plurality of display regions 24a to 24e can adjust luminance based on control performed by the controller 21. The display unit 24 turns on a backlight located in each of the plurality of display regions 24a to 24e based on the luminance adjusted by the controller 21. The display unit 24 displays light from the backlight on the half mirror in a see-through manner. Hereinafter, an example of each of the display regions 24a to 24e will be described.

The first display region 24a is a display region that is constantly in the mirror mode and displays the mirror image of the user H1 who faces the mirror monitor M1 and is located on the front side of the mirror monitor M1. In this manner, the user H1 can constantly check the front-side view of his/her own.

The second display region 24b displays a video image captured by the camera M2 disposed behind the user H1. In This manner, the user H1 can arrange hair while checking hands and back of head. The captured video image displayed in the second display region may be controlled by a predetermined command based on voice of the user H1. As for the predetermined command with respect to the captured video image displayed in the second display region, the video image captured by the camera M2 is displayed when the predetermined command is "ON", the display of the video image captured by the camera M2 is ended when the predetermined command is "OFF", a part of the captured video image is displayed in an enlarged manner when the predetermined command is "large", and the captured video image is reduced to display the entire back view when the predetermined command is "smaller".

The predetermined commands are not limited these commands, and any commands may be set as long as the commands are for executing control regarding display of the video image captured by the camera M2.

The predetermined command may include a command for sharing the video image captured by the camera M2 with other users. In a case in which the predetermined command in this case is recognized, the controller 21 transmits a control signal for transmitting the captured video image to the user terminal P1 and causing the captured video image to be stored. The controller 21 transmits a control signal such that the captured video image stored in the user terminal P1 is stored in the released data 42b allocated to the user H1 in the server S1 and the captured video image is released to other users. In a case in which the mirror monitor M1 and the server S1 can communicate with each other, the controller 21 transmits control signals to cause the captured video image to be transmitted to and stored in the user terminal P1 and to cause the server S1 to store the captured video image in the released data 42b allocated to the user H1, respectively.

These predetermined commands are not limited thereto, and any command may be set as long as the commands are for executing storage of the video image captured by the camera M2 and control regarding releasing thereof to other users.

The third display region 24c displays favorite video images (in other words, other captured video image of other users) selected or registered by the user terminal P1. In this manner, the user H1 can arrange hair of the user H1 while referring to (in other words, referring to as a model) favorite hair arrangement video images of other users. Also, the favorite video images displayed in the third display region may be controlled by a predetermine command based on voice of the user H1. As for the predetermined command with respect to a favorite video image displayed in the third display region, the favorite video image is replayed when the predetermined command is "start", the replay of the favorite video image is temporarily stopped when the predetermined command is "stop", the favorite video image at a point going back from the current replay time of the favorite video image by a predetermined period of time is displayed when the predetermined command is "go back", and the favorite video image at a point going ahead from the current replay time of the favorite video image by a predetermined period of time is displayed when the predetermined command is "go ahead", for example.

The predetermined commands are not limited to these commands, and any commands may be set as long as the commands are for executing control regarding display of the favorite video images (in other words, other captured video images of other users) selected or registered by the user terminal P1.

The fourth display region 24d displays a list of thumbnails indicating a latest history of hair arrangement captured in the past by the camera M2. In this manner, the user H1 can refer to the list in a case in which he/she desires to arrange hair differently from hair arrangement in the past and can refer to hair arrangement that he/she liked in the past. The fourth display region 24d may display a list of thumbnails of a history of replayed favorite video images registered as favorite by the user terminal P1.

The fifth display region 24e displays advertisement data created by a company, a hair salon, or the like and stored in the server S1 based on an operation history regarding hair arrangement performed by the user H1 using the user terminal P1. In this manner, the user H1 can receive advertisement suitable for the user H1, and the company, the hair salon, and the like can perform efficient advertisement.

As described above, the display unit 24 has the plurality of display regions 24a to 24e. In this manner, the user H1 can perform display of the video image captured by the camera M2 and replay of a favorite video image registered in the user terminal P1 at the same time by checking the front side of the user H1 through the mirror image. Further, the user H1 can obtain advertisement data suitable for the user H1. Also, a company, a hair salon, and the like can perform efficient advertisement.

The mirror monitor M1 may display the captured video image captured by the camera M2 on the entire surface of the display unit 24 by switching the mirror mode and the monitor mode.

Figure 7:
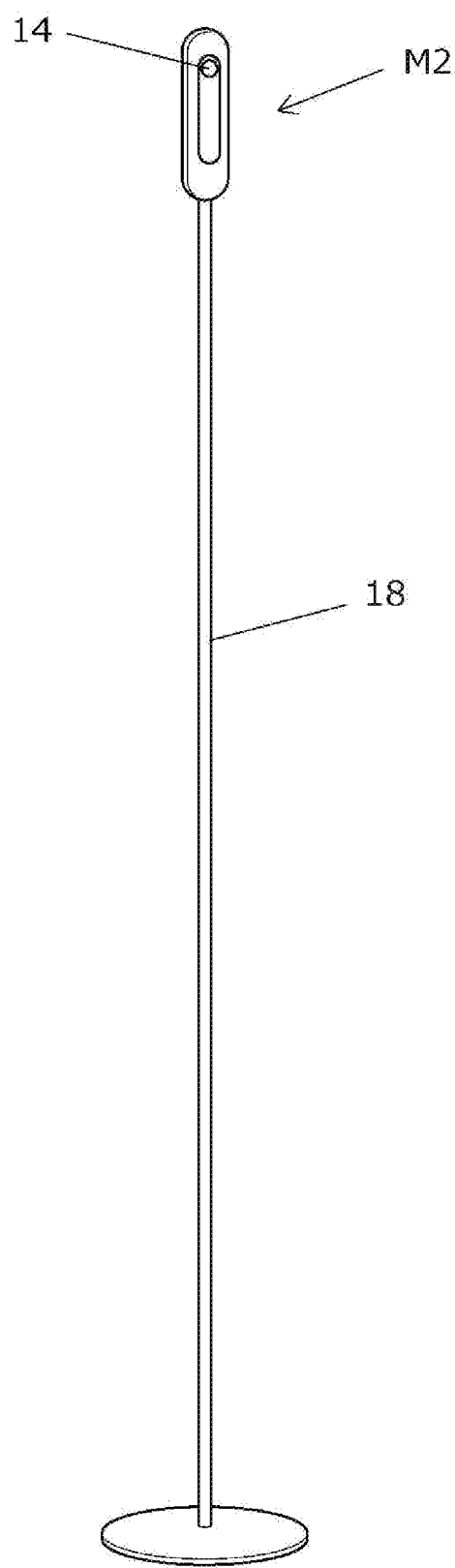
FIG. 7 is a diagram illustrating an example of the camera.

FIG. 7 is a diagram illustrating an example of the camera M2. The camera M2 is configured to have the imaging unit 14 and an adjustment unit 18 that is stretchable in a height direction.

The imaging unit 14 has, as an imaging element, a charge coupled device (CCD) or a complementary metal oxide semiconductor (CMOS). The imaging unit 14 images the back view of the user H1 and images how the hair is being arranged, including the back of head of the user H1 and the hands of the user H1. The imaging unit 14 has a focus lens that can adjust the focal point distance, a zoom lens that can change a zooming magnification, and a gain adjustment unit that can adjust sensitivity of the imaging element. The imaging unit 14 outputs the captured video image to the controller 11.

The adjustment unit 18 holds the imaging unit 14 at a height at which the imaging unit 14 can image how the hair is being arranged, including the back of head of the user H1 and the hands of the user H1. The adjustment unit 18 can make adjustment such that the imaging unit 14 is located at a height of 50 cm to 180 cm from the floor, for example.

The hair salon camera M3 is configured to further include a caster in addition to the camera M2 as illustrated in FIG. 7. In this manner, even in a case in which only a small number of hair salon cameras M3 are present relative to a plurality of seats for treating guests, for example, it is possible to easily move the hair salon cameras M3 and to adjust the positions thereof.

FIG. 8 is a sequence diagram illustrating an operation procedure example of the back mirroring system 100 according to the first embodiment.

The camera M2 turns on the power supply to the mirror monitor M1 (T1).

The camera M2 starts to image the back view of the user H1 and transmits the captured video image to the mirror monitor M1. The mirror monitor M1 displays the captured video image received from the camera M2 in the second display region 24b (T2).

The mirror monitor M1 transmits the received captured video image to the user terminal P1. The user terminal P1 stores the captured video image received from the mirror monitor M1 (T3).

The user terminal P1 sets information about a hair salon that is a transmission destination of the stored captured video image. The user terminal P1 creates and sets counseling details regarding the captured video image or hair arrangement as a text. The user terminal P1 transmits the captured video image and the counseling details to the server S1 and provides, to the server S1, a command to transfer the captured video image and the counseling details to the hair salon, which is the transmission destination, based on the information about the hair salon set in the captured video image (T4).

The server S1 receives the captured video image and the counseling details from the user terminal P1. The server S1 refers to the hair salon data based on the information about the hair salon set in the received captured video image and transfers the captured video image and the counseling details to the hair salon terminal P2 mounted in the hair salon CU2. The hair salon terminal P2 displays the captured video image and the counseling details received from the server S1 on the display unit 64 (T5).

The hair salon terminal P2 receives an operation input by a hair stylist who belongs to the hair salon CU2 and creates responding details to the counseling details using a text, voice, and a video image (T6).

The hair salon terminal P2 transmits the created responding details to the server S1 and provides, to the server S1, a command to transfer the responding details to the user terminal P1. The server S1 transmits the responding details received from the hair salon terminal P2 to the user terminal P1. The user terminal P1 displays the responding details received from the server S1 on the display unit 34 (T7).

In this manner, the back mirroring system 100 according to the first embodiment enables easy acquisition of appropriate advice regarding hair arrangement from a hair stylist and can support the user H1 to improve techniques for hair arrangement.

Figure 9A:
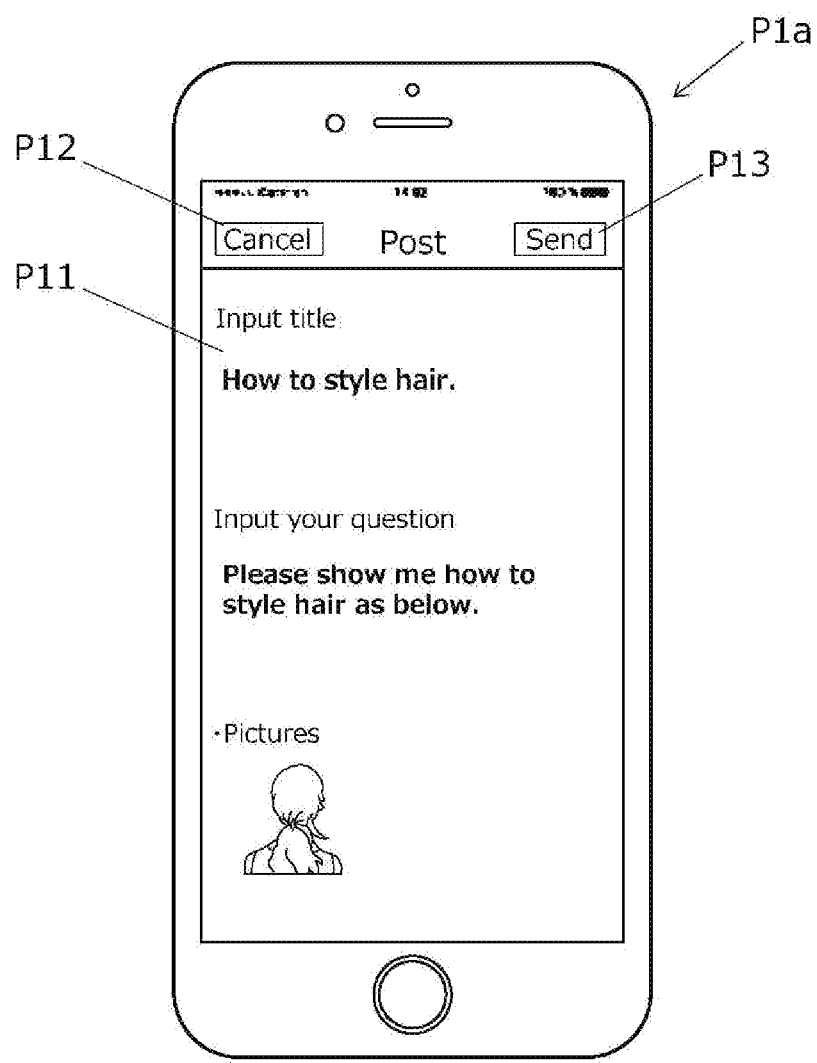
FIG. 9A is a diagram illustrating an example in which counseling details are created using a user terminal.
Figure 9B:
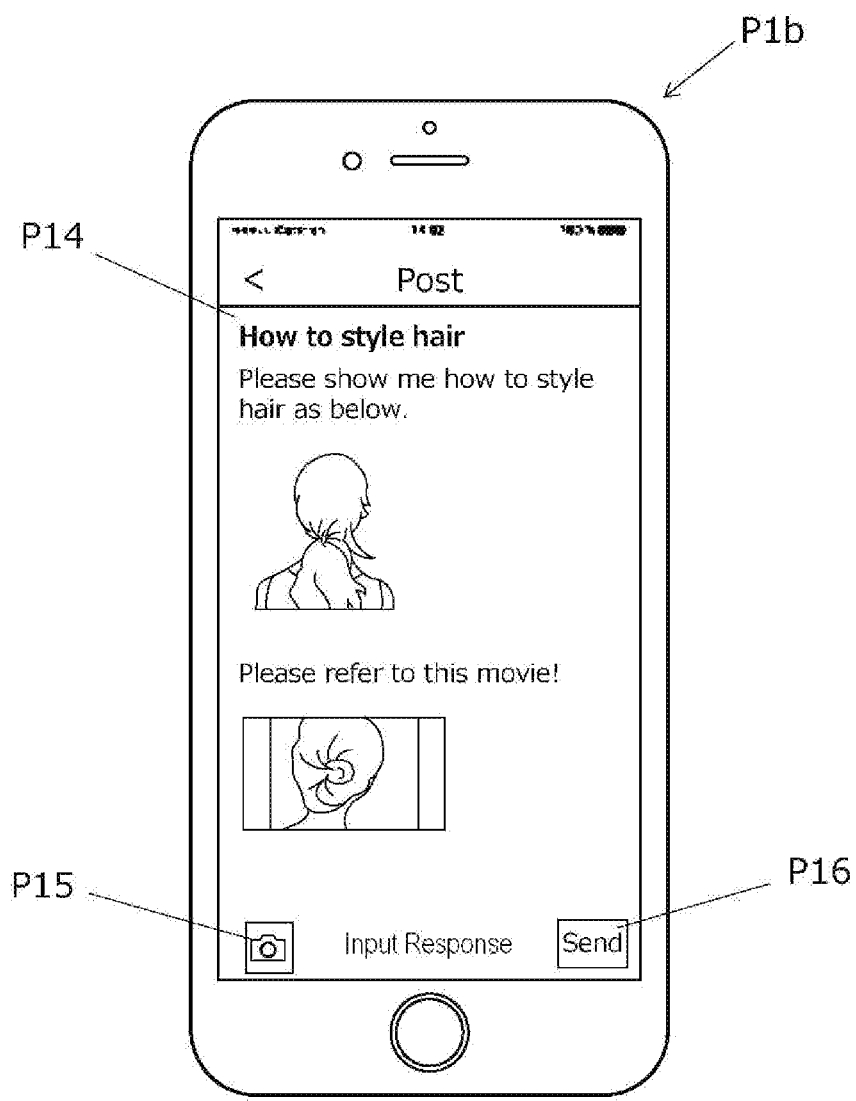
FIG. 9B is a diagram illustrating an example in which responding details are created using a hair salon terminal.

FIG. 9A is a diagram illustrating an example in which counseling details P11 are created in the user terminal P1. FIG. 9B is a diagram illustrating an example in which responding details are created in the hair salon terminal P2.

The user terminal P1 creates counseling details regarding the captured video image or hair arrangement through an operation input by the user H1. The counseling details P11 are created so as to include a title indicating an outline of the counseling details, sentences to be consulted, which are created as texts, and a thumbnail of the captured video image or an image captured by the imaging unit 36 of the user terminal P1, for example. The counseling details P11 may be created so as to include a thumbnail of another captured video image of another user that the user H1 refers to or an image captured by another user terminal of another user. The counseling details P11 may include any counseling details P11 as long as the counseling details relate to hair arrangement and may be created to have a configuration including only sentences to be consulted created as texts. The user terminal P1 has a stop button P12 that stops transmission of the counseling details P11 created through an operation input by the user H1 and a transmission button P13 for transmitting the created counseling details P11 to the hair salon terminal P2, on a screen for creating the counseling details P11.

The hair salon terminal P2 creates responding details P14 created through an operation input by the hair stylist. The responding details P14 are created so as to include sentences to be responded created as texts, a captured video image related to the counseling details or the responding details, and response data (not illustrated) using a captured image or voice, for example. The responding details P14 may be created to include a video image or an image captured by the hair stylist operating an imaging button P15 for capturing a video image or an image. The hair salon terminal P2 has a transmission button P16 for transmitting the responding details P14 created through an operation input by the stylist to the user terminal P1 on a screen for creating the responding details P14.

Figure 10:
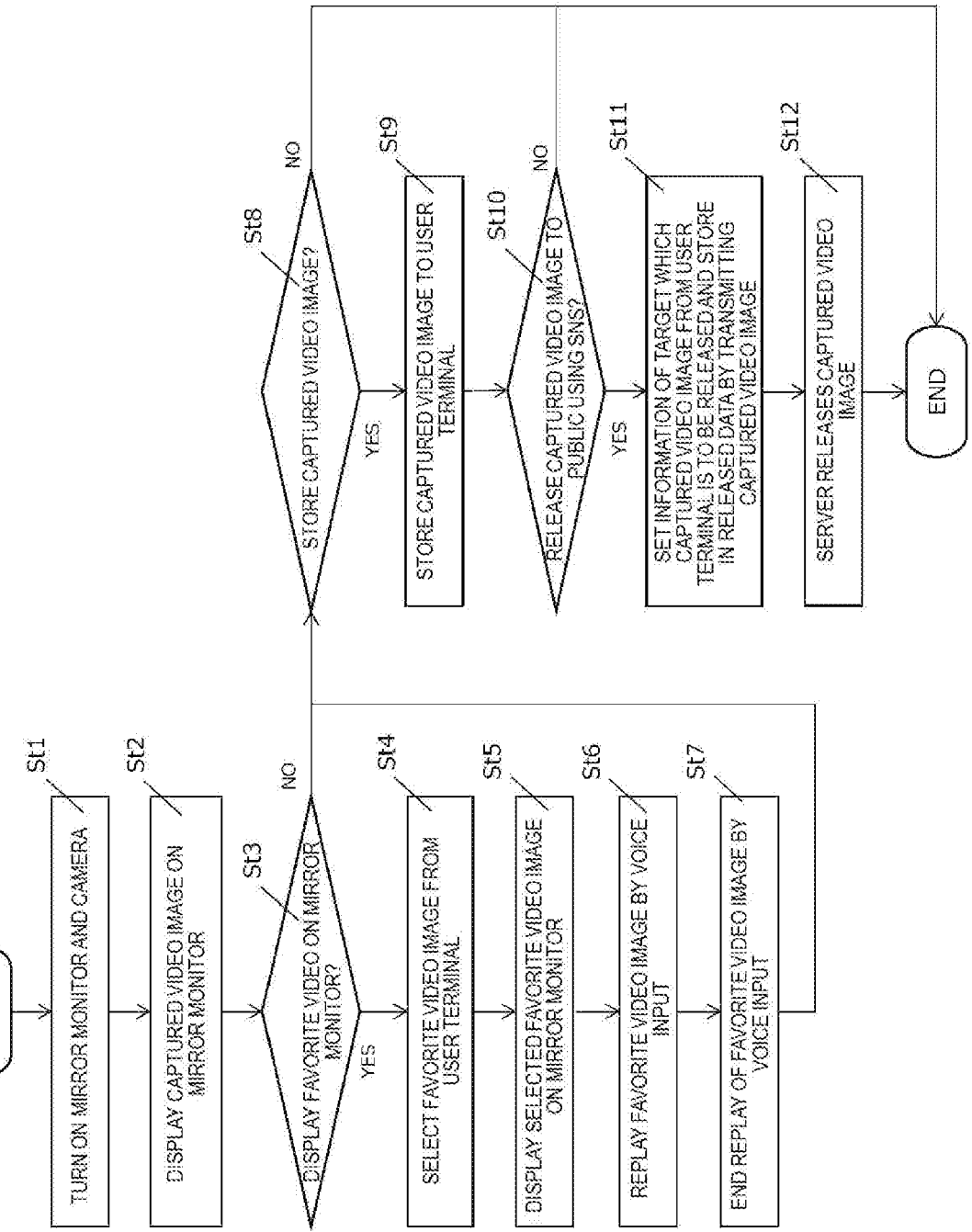
FIG. 10 is a diagram illustrating an operation procedure example of the back mirroring system in a user's home according to the first embodiment.

FIG. 10 is a diagram illustrating an operation procedure example of the back mirroring system 100 in the user's home CU1 according to the first embodiment.

Power supplies to the mirror monitor M1 and the camera M2 are turned on (SU).

The mirror monitor M1 displays, in the second display region 24b, the captured video image of the back view of the user H1 captured by the camera M2 (St2).

The user H1 decides whether or not to display other captured video images of other users registered as favorite video images in the user terminal P1. In a case in which a favorite video of the user H1 is displayed (St3, YES), the mirror monitor M1 receives the favorite video image selected by the user H1 from the user terminal P1 (St4). In this manner, the user H1 can perform favorite hair arrangement with reference to the favorite video image.

The mirror monitor M1 displays the favorite video image received from the user terminal P1 in the third display region 24c (St5). In this manner, the user H1 can perform hair arrangement while viewing the favorite video image.

The mirror monitor M1 outputs voice of the user H1 input to the microphone 27 to the voice recognizer 26. The mirror monitor M1 recognizes a predetermined command (for example, "replay", "start", or the like) for replaying the favorite video image from the voice input to the voice recognizer 26 and outputs the predetermined command to the controller 21. The mirror monitor M1 replays the favorite video image based on the control performed by the controller 21 (St6). In this manner, the user H1 can replay the favorite video image without any need to perform an operation using hands and can arrange hair using both the free hands.

The mirror monitor M1 outputs, to the voice recognizer 26, the voice of the user H1 input to the microphone 27. The mirror monitor M1 recognizes a predetermined command (for example, "end" or the like) for ending the replay of the favorite video image from the voice input to the voice recognizer 26 and outputs the predetermined command to the controller 21. The mirror monitor M1 ends the replay of the favorite video image based on the control performed by the controller 21 (St7). In this manner, the user H1 can end the favorite video image without any need to perform an operation using hands.

In a case in which the user H1 does not display any favorite video image (St3, NO), or in a case in which the user H1 displays the favorite video image in Step St7 and ends the replay of the favorite video image, the mirror monitor M1 allows the user H1 to select whether or not to store the video image captured by the camera M2 (St8). In this manner, the user H1 can store only the captured image that the user H1 likes.

In a case in which the user H1 selects to store the captured video image in Step St8 (St8, YES), the mirror monitor M1 transmits the captured video image to the user terminal P1. The user terminal P1 stores the captured video image received from the mirror monitor M1 (St9).

The user H1 selects whether or not to release the captured video image to the public using an SNS and inputs the selection to the user terminal P1 (St10). In this manner, the user H1 can easily share the captured video image that the user H1 likes with other users.

In A case in which the user H1 selects to release the captured video image to the public in Step St10 (St10, YES), the user terminal P1 further sets a target of the releasing in the captured video image and transmits the setting to the server S1. The server S1 stores the captured video image in the released data 42b based on the setting of the target to which the captured video image received from the user terminal P1 is to be released (St11).

The server S1 releases the captured video image by setting the captured video image such that other users based on the setting of the target to which the captured video image is to be released can view the captured video image (St12). In this manner, the user H1 and other users can share captured video images regarding hair arrangement captured by a variety of users and can freely view the captured images.

In a case in which the user H1 selects not to store the captured video image in Step St8 (St8, NO), the back mirroring system 100 ends the series of control operations. In a case in which the user H1 selects not to release the captured video image to the public in Step St10 (St10, NO), the back mirroring system 100 ends the series of control operations.

Figure 11A:
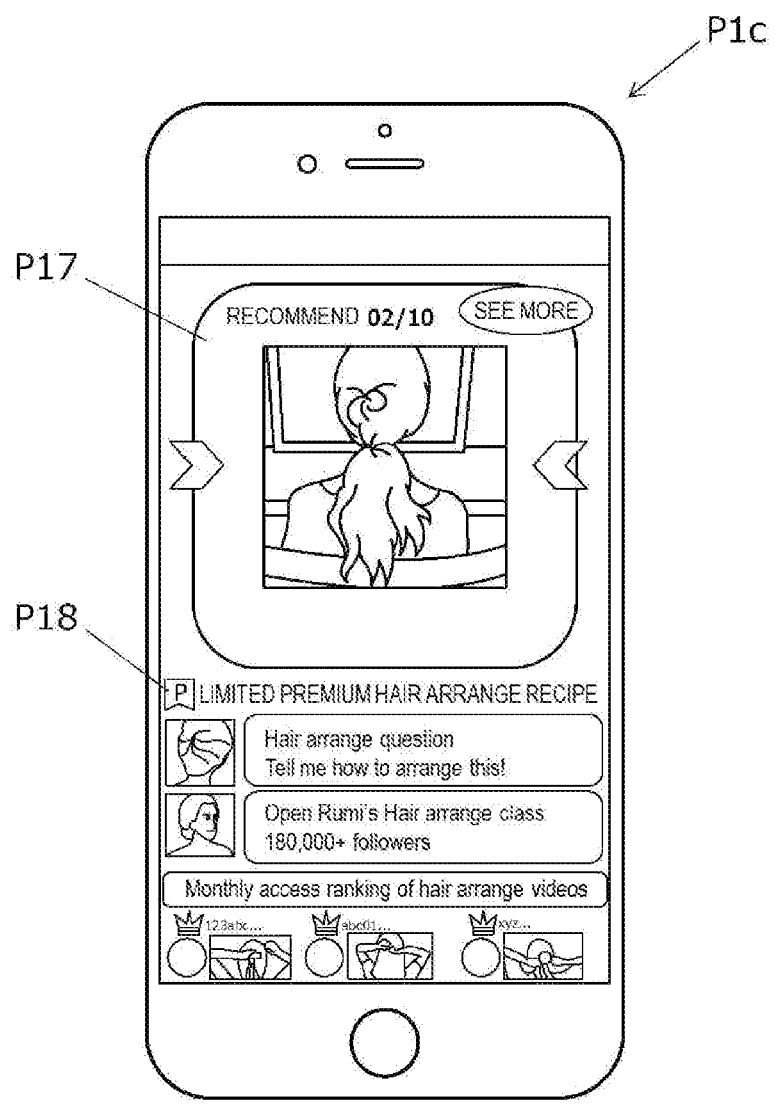
FIG. 11A is a diagram illustrating a display example in which a thumbnail of another captured video image stored in released data in a storage of a server is displayed on a user terminal.

FIG. 11A is a diagram illustrating a display example in which thumbnails of other captured video images stored in the released data 42b in the storage 42 of the server S1 are displayed on the user terminal P1. In a case in which a predetermined condition, such as a condition that the number of views or the number of registrations as a favorite video image is large, is satisfied, the released data 42b is displayed as a recommended video image P17 on a display screen P1c of the user terminal P1. Also, other captured video images of other users that satisfy another predetermined conditions, such as a condition that the numbers of views or the numbers of registrations as favorite video images are large are similarly displayed in the display unit 34 of the user terminal P1 as premium hair arrange recipes P18.

Figure 11B:
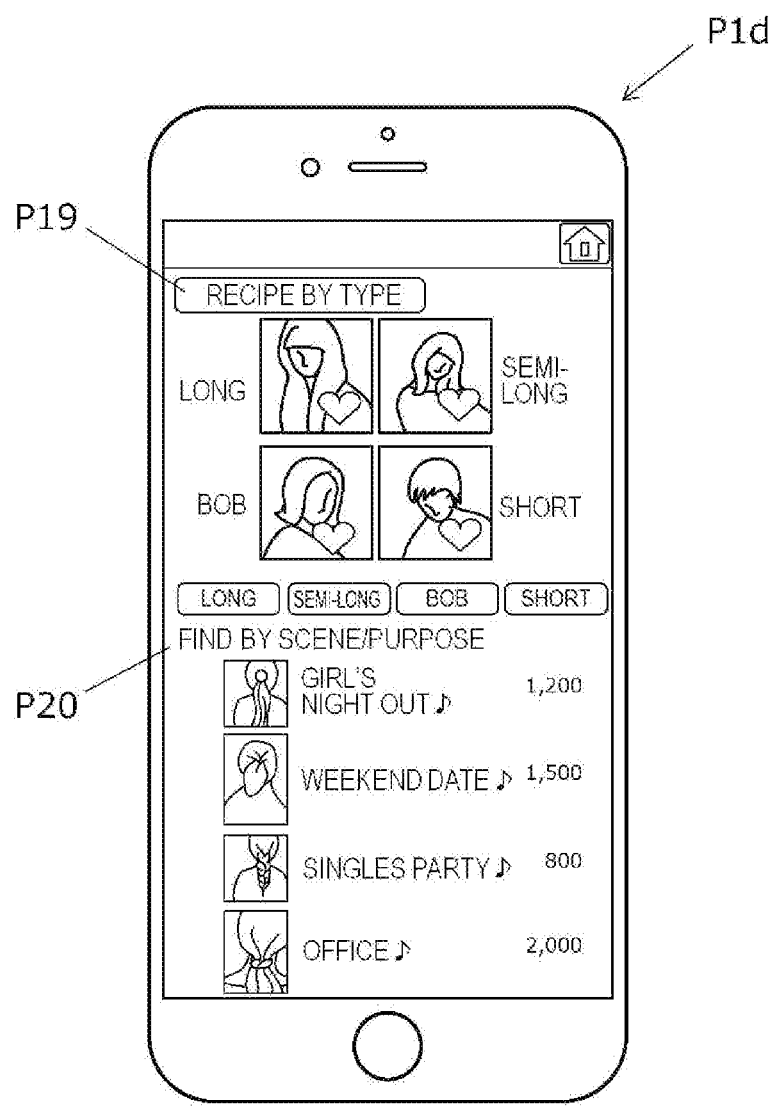
FIG. 11B is a diagram illustrating a search example of a favorite video image in the user terminal.

FIG. 11B is a diagram illustrating a search example of a favorite video image in the user terminal P1. FIG. 11B illustrates a display screen P1d representing a search page for searching a favorite video image on the user terminal P1. In a case in which the user H1 searches for a favorite video image, the user H1 can search for other captured video images of other users by selecting recipes P19 for the respective types that categorize hair arrangement methods depending on how long hair is. In the case in which the user H1 searches for a favorite video image, the user can search for other captured video images of other users capturing hair arrangement methods suitable for the respective scenes by selecting any one of scenes among recipes P20 for the respective scenes that categorize hair arrangement methods depending on the scenes.

Figure 11C:
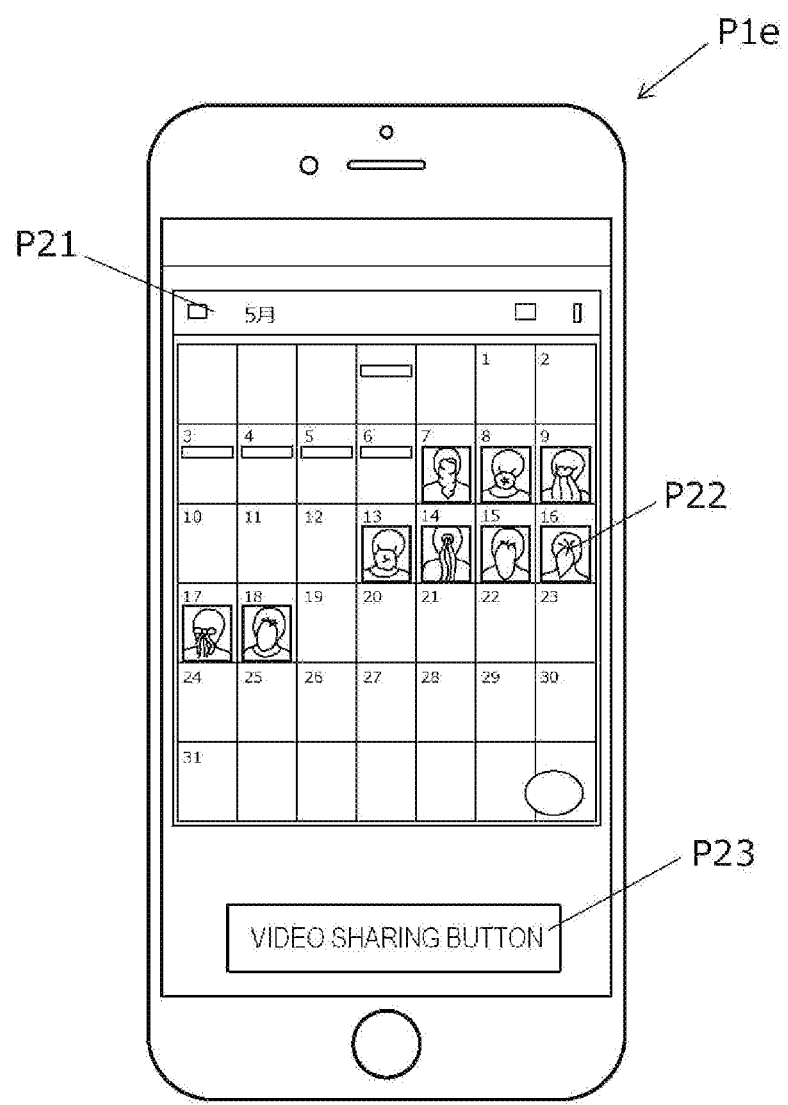
FIG. 11C is a diagram illustrating a display example of a list of captured video images on the user terminal.

FIG. 11C is a diagram illustrating an example in which a list of captured video image is displayed on the user terminal P1. FIG. 11C illustrates a display screen P1e displaying a list of thumbnails P22 of captured video images stored in the user terminal P1 on a calendar P21. The method for displaying the captured video image is not limited to the calendar, and the user terminal P1 may display a list of hair arrangement methods for the respective scenes or in the respective categories or may allow the user H1 to select a categorization method for list display. Further, in a case in which the user H1 selects a captured video image from among video images captured in the past and selects a video sharing button P23, the user terminal P1 transmits the captured video image to the server S1. The Server S1 stores the received captured video image in the released data 42b and releases the captured video image to other users using an SNS. In this manner, the user H1 can easily post the captured video image that the user H1 likes on the SNS and releases the captured video image to other users.

As described above, the back mirroring system according to the first embodiment has the camera M2 that is disposed behind the user H1 and images the back view of the user H1 and the mirror monitor M1 that reflects the mirror image of the front side of the user H1 and displays the video image captured by the camera M2, and the captured video image is stored in the user terminal P1. The user terminal P1 sets information about the hair salon CU2 that is the transmission destination of the captured video image in the stored video image and transmits captured video image with the set information to the server S1. The server S1 transmits the captured video image to the hair salon terminal P2 disposed in the hair salon CU2 based on the set information about the hair salon CU2. The hair salon terminal P2 creates, for the received captured video image, responding details (an example of details to be pointed out) regarding hair arrangement from the hair stylist who has viewed the captured video image. The user terminal P1 receives the responding details created by the hair stylist via the hair salon terminal P2 and the server S1 an displays the responding details.

In this manner, the back mirroring system 100 can support the user H1 to improve techniques for hair arrangement since it is possible to allow the user H1 to easily acquire appropriate advice regarding hair arrangement from the hair stylist in response to the counseling details regarding a hair arrangement method suitable for the user H1.

The mirror monitor M1 can perform control between the mirror mode in which the mirror image of the front side of the user H1 is reflected on the entire surface of the mirror monitor M1 and the monitor mode in which different data is displayed in each of the plurality of display regions 24a to 24e on the mirror monitor M1. In this manner, the mirror monitor M1 can have the function as a mirror for reflecting the front side of the user H1 and the function as a display for displaying different data.

The mirror monitor M1 can execute the mirror mode and the monitor mode at the same time on the entire surface of the mirror monitor M1. In this manner, the user H1 can view the mirror image of the front side of the user H1 himself/herself and different data at the same time on the same screen.

The mirror monitor M1 can reflect the front side of the user H1 and displays the captured video image of the back view of the user H1 in any of the plurality of display regions 24a to 24e in the mirror mode. In this manner, the user H1 can view the mirror image of the front side of the user H1 himself/herself and the back view of the user Ell himself/herself who is arranging hair at the same time and can check hands with which the hair is being arranged form the captured back view by checking an overall balance of the mirror image of the front side.

The mirror monitor M1 can display another captured video image of another user registered in the server S1 in any one of the plurality of display regions 24a to 24e. In this manner, the user H1 can arrange hair of the user H1 himself/herself while referring to another captured video image regarding hair arrangement of another user and can improve techniques for hair arrangement.

The mirror monitor M1 can display a plurality of video images captured in the past in any one of the plurality of display regions 24a to 24e. In this manner, the user H1 can check hair arrangement performed in the past.

The server S1 has advertisement data regarding hair arrangement of the user H1. The mirror monitor M1 displays advertisement data related to information about the user H1 stored in the user terminal P1 in the advertisement data in any one of the plurality of display regions 24a to 24e. The user terminal P1 acquires the advertisement data regarding hair arrangement of the user H1 from the server S1. The user terminal P1 can extract advertisement data based on an operation history for hair arrangement in the user terminal P1 from the advertisement data and causes the mirror monitor M1 to display the extracted advertisement data. In this manner, the user H1 can receive provision of advertisement data suitable for the user H1. Also, a company or a hair salon can provide advertisement data suitable for the user H1.

The mirror monitor M1 further includes the microphone 27 to which voice of the user H1 is input and the voice recognizer 26 that recognizes a predetermined command based on the voice. The controller 21 in the mirror monitor M1 can execute control regarding display of the captured video image based on the predetermined command recognized by the voice recognizer 26. In this manner, the user H1 can perform control on the mirror monitor M1 or the camera M2 through voice and can use both hands for hair arrangement.

The mirror monitor M1 further includes the power supply unit that supplies electricity to the mirror monitor M1 and the controller 21 that can adjust luminance of the mirror monitor and can execute the mirror mode, adjust luminance, and further executes the monitor mode in a state in which the power supply unit 29 is turned on. In this manner, the mirror monitor M1 can easily switch the mirror mode and the monitor mode by turning on and off the power supply.

The mirror monitor M1 further includes the controller that can adjust luminance of the mirror monitor M1 can execute the mirror mode, adjust the luminance to a predetermined value, and then execute the mirror mode in a state in which the luminance is zero. In this manner, the mirror monitor M1 can display different data in each of the plurality of display regions 24a to 24e by adjusting the luminance and can execute the mirror mode at the same time.

Hereinafter, other aspects of the respective components in the first embodiment will be described.

Although the counseling details are created and is transmitted from the user terminal P1 to the hair stylist in the hair salon CU2 in the back mirroring system 100 according to the first embodiment, the transmission destination may be another user. In this manner, the user H1 can consult with an instructor who teaches at a hair arrangement class, a stylist who works for a place other than a hair salon, a company that manufactures or sells hair accessories or hair care products, or another user skilled in the hair arrangement. In this manner, the user H1 can improve techniques for hair arrangement and can learn knowledge a lot about hair arrangement, hair care, and the like. Further, companies, hair salons, or other people who have business related to hair arrangement or hair care can easily propose and develop various kinds of business.

According to the back mirroring system 100 in the first embodiment, a favorite video that is a registered live video image can be replayed using the user terminal P1. In this manner, the user H1 can join an arrangement class held in a remote city online in real time.

According to the back mirroring system 100 in the first embodiment, captured video images of the respective users can be stored in the released data 42*b* in the server S1 from the respective user terminals. Further, the captured video images stored in the released data 42*b* in the server S1 are shared among the respective users. In this manner, the respective user can acquire information about trend hair arrangement, hair care, hair accessories, and the like and can realize not only an improvement in techniques for hair arrangement but also widening a range of the hair arrangement.

The advertisement data according to the first embodiment may be data regarding not only hair arrangement but also hair care. For example, the advertisement data may be advertisement regarding a treatment product that has newly sold or may be advertisement of a new treatment menu regarding hair care in a hair salon. Further, the advertisement data may be data regarding hair accessories.

Although various embodiments have been described above with reference to the accompanying drawings, the present disclosure is not limited to such examples. It is obvious for those skilled in the art that various modification examples, correction examples, replacement examples, addition examples, deletion examples, and equivalent examples can be achieved within the scope described in the claims, and it should be appreciated that these also belong to the technical scope of the present disclosure. The respective components in the aforementioned various embodiments may be appropriately combined without departing from the gist of the invention.

The present disclosure is useful as a back mirroring system and a back mirroring method that enables easy acquisition of appropriate advice regarding hair arrangement from a hair stylist and can support a user to improve techniques for hair arrangement.

What is claimed is:

1. A back imaging system comprising:
   a camera operative to be disposed behind a user and configured to capture a video image of a back view of the user;
   a monitor configured to simultaneously display:
      the video image captured by the camera in a first display region of a plurality of display regions of the monitor,
      a first video image captured by another user, registered by a server, in a second display region of the plurality of display regions, and
      a plurality of previously captured images of the user in a third display region of the plurality of display regions, wherein the first, second and third display regions are non-overlapping regions;
   a user terminal configured to:
      communicate with the monitor and the server,
      receive, from the monitor, the video image captured by the camera,
      set information about a hair salon that is a transmission destination of the video image, and
      transmit the information to the server; and
   a hair salon terminal operative to be disposed in the hair salon, the hair salon terminal being connected and communicable to the user terminal via the server-, and configured to display the video image sent from the user terminal via the server for a hair stylist to review,
   wherein the user terminal receives and displays details associated with hair arrangement from the hair stylist.

2. The back imaging system according to claim 1, wherein the monitor is a mirror monitor and the monitor is configured to switch to operating in a mirror mode in which a mirror image of a front side of the user is reflected on an entire surface of the monitor.

3. The back imaging system according to claim 2, wherein the monitor is configured to simultaneously operate in the mirror mode and a monitor mode in which the plurality of display regions are superposed a reflection of the user.

4. The back imaging system according to claim 2, wherein the user terminal acquires advertisement data regarding the hair arrangement of the user from the server, extracts, from the advertisement data, advertisement data based on an operation history of the hair arrangement in the user terminal, and causes the monitor to display the extracted advertisement data.

5. The back imaging system according to claim 2, wherein the monitor further includes a microphone to which voice of the user is input, a voice recognizer that is configured to recognize a predetermined command based on the voice, and a controller that is configured to execute control regarding display of the captured video image, and
   the controller executes control regarding display of the captured video image based on the predetermined command recognized by the voice recognizer.

6. The back imaging system according to claim 2, wherein the monitor further includes:
   a power supply unit that is configured to feed electricity to the monitor; and
   a controller that is configured to adjust luminance of the monitor, and wherein the mirror mode is executed in a state in which the power supply unit is turned on, and the luminance is adjusted, so that a monitor mode is further executed along with the mirror mode.

7. The back imaging system according to claim 2, wherein the monitor further includes a controller that is configured to adjust luminance of the monitor, and the mirror mode is executed in a state in which the luminance is zero, and the luminance is adjusted to a predetermined value, so that a monitor mode is executed.

8. A back imaging method comprising:
   imaging, by a camera, a back view of a user;
   simultaneously displaying by a monitor:
      a video image captured by the camera in a first display region of a plurality of display regions of the monitor,
      a first video image captured by another user, registered by a server, in a second display region of the plurality of display regions, and
      a plurality of previously captured images of the user in a third display region of the plurality of display regions, wherein the first, second and third display regions are non-overlapping regions;

receiving, by a user terminal and from the monitor, the video image captured by the camera;

communicating, by the user terminal, with each of the monitor and the server, and setting information about a hair salon that is a transmission destination of the video image;

transmitting, by the user terminal, the information to the server;

communicating, by a hair salon terminal disposed in the hair salon, with the user terminal, the hair salon terminal being connected to the user terminal via the server;

displaying, by the hair salon terminal, the captured video image sent from the user terminal via the server for a hair stylist to review; and receiving, by the user terminal, details associated with hair arrangement from the hair stylist.

* * * * *